US012745886B2

(12) United States Patent
Jang et al.

(10) Patent No.: US 12,745,886 B2
(45) Date of Patent: Sep. 29, 2026

(54) AI ROBOT CLEANER AND ROBOT SYSTEM HAVING THE SAME

(71) Applicant: LG ELECTRONICS INC., Seoul (KR)

(72) Inventors: Jaewon Jang, Seoul (KR); Yeongjae Lee, Seoul (KR); Seaunglok Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1222 days.

(21) Appl. No.: 17/637,551

(22) PCT Filed: Feb. 17, 2020

(86) PCT No.: PCT/KR2020/002197
§ 371 (c)(1),
(2) Date: Feb. 23, 2022

(87) PCT Pub. No.: WO2021/040160
PCT Pub. Date: Mar. 4, 2021

(65) Prior Publication Data

US 2022/0287534 A1 Sep. 15, 2022

(30) Foreign Application Priority Data

Aug. 27, 2019 (KR) ........................ 10-2019-0105318
Jan. 3, 2020 (KR) ........................ 10-2020-0000784

(51) Int. Cl.
*A47L 11/40* (2006.01)
*A47L 11/282* (2006.01)
(Continued)

(52) U.S. Cl.
CPC ......... *A47L 11/4011* (2013.01); *A47L 11/282* (2013.01); *A47L 11/4038* (2013.01);
(Continued)

(58) Field of Classification Search
CPC ............... A47L 11/282; A47L 11/4011; A47L 11/4038; A47L 11/4066; A47L 11/4069; A47L 2201/04; A47L 2201/06
See application file for complete search history.

(56) References Cited

U.S. PATENT DOCUMENTS

2019/0223677 A1 7/2019 Yoon et al.

FOREIGN PATENT DOCUMENTS

CN 201370543 12/2009
CN 106166049 A * 11/2016
(Continued)

OTHER PUBLICATIONS

International Search Report dated Jun. 12, 2020 issued in Application No. PCT/KR2020/002197.
(Continued)

*Primary Examiner* — Brian D Keller
(74) *Attorney, Agent, or Firm* — KED & ASSOCIATES, LLP

(57) ABSTRACT

Disclosed is a robot system including: a robot cleaner configured to perform wet cleaning in a cleaning zone; a server configured to communicate with the robot cleaner and perform control of the robot cleaner; and a user terminal configured to be in association with the robot cleaner, and control the robot cleaner as an application for the control of the robot cleaner is activated, wherein the robot cleaner includes: a main body configured to form an outer shape; a pair of rotary mop modules configured to be rotatably installed in the main body, move the main body while rotating, and have a mop cloth attached to a rotating plate of a lower portion; a drive motor configured to rotate the pair of rotary mop modules; a mop detecting unit configured to detect an error state of the mop cloth attached to the rotating plate and output a detection signal; and a controller config-
(Continued)

ured to determine the error state of the mop cloth according to the detection signal from the mop detecting unit, and control driving of the rotary mop module.

23 Claims, 20 Drawing Sheets

(51) Int. Cl.
*H04M 1/72415* (2021.01)
*G05D 1/00* (2006.01)

(52) U.S. Cl.
CPC ....... *A47L 11/4066* (2013.01); *A47L 11/4069* (2013.01); *H04M 1/72415* (2021.01); *A47L 2201/04* (2013.01); *A47L 2201/06* (2013.01); *G05D 1/0276* (2013.01)

(56) References Cited

FOREIGN PATENT DOCUMENTS

| | | |
|---|---|---|
| CN | 106214077 A * | 12/2016 |
| CN | 106805851 | 6/2017 |
| KR | 10-2004-0052094 | 6/2004 |
| KR | 10-2009-0019480 | 2/2009 |
| KR | 10-2014-0146702 | 12/2014 |
| KR | 10-2015-0006525 | 1/2015 |
| KR | 10-2017-0128248 | 11/2017 |
| KR | 10-1911294 | 10/2018 |
| KR | 10-2019-0004349 | 1/2019 |
| KR | 10-2019-0088691 | 7/2019 |
| TW | 201932065 | 8/2019 |
| WO | WO 2019/143172 | 7/2019 |

OTHER PUBLICATIONS

Taiwanese Office Action dated May 24, 2021 issued in Application No. 109128282.

European Search Report dated Aug. 18, 2023 issued in Application No. 20859269.1.

* cited by examiner

FIG. 15B
Smart ThinQ
•MOP CLEANER M9
"PLEASE, ATTACH MOP CLOTH AGAIN"
RETURN
STOP CLEANING
3

AI ROBOT CLEANER AND ROBOT SYSTEM HAVING THE SAME

CROSS-REFERENCE TO RELATED PATENT APPLICATIONS

This application is a U.S. National Stage Application under 35 U.S.C. § 371 of PCT Application No. PCT/KR2020/002197, filed Feb. 17, 2020, which claims priority to Korean Patent Application Nos. 10-2019-0105318, filed Aug. 27, 2019 and 10-2020-0000784, filed Jan. 3, 2020, whose entire disclosures are hereby incorporated by reference.

TECHNICAL FIELD

The present disclosure relates to a control method of a robot cleaner, and more particularly, to a control method of an artificial intelligence robot cleaner using a rotary mop.

BACKGROUND ART

Recently, the use of robots in the home is gradually increasing. A representative example of such a home robot is a cleaning robot. The cleaning robot is a moving robot that travels on a certain zone by itself, and sucks foreign matter such as dust accumulated on the floor to clean a cleaning space automatically, or can be moved by using a rotary mop and perform cleaning by using the rotary mop to wipe the floor. In addition, is also possible to mop the floor by supplying water to the rotary mop.

However, if the water supplied to the rotary mop is not properly adjusted, there is a problem in that the floor cannot be cleaned appropriately, as if excessive water is remained on the floor to be cleaned or the floor is wiped with a dry mop. In the case of Korean Publication Patent No. 1020040052094, a cleaning robot capable of performing water cleaning, while including a mop roller having a mop cloth on its outer circumferential surface to wipe off the steam sprayed on the floor with dust, is disclosed. Such a cleaning robot sprays steam on the surface of the cleaning floor for wet cleaning, and has a cloth for mop to wipe off the sprayed steam and dust. In addition, Korean Publication Patent No. 20140146702 discloses a robot cleaner for determining whether water can be accommodated inside a robot cleaner capable of performing wet cleaning, and a control method thereof.

Meanwhile, Korean Patent Publication No. KR20090019480A discloses a robot cleaner equipped with an infrared sensor for simultaneously detecting a step and a threshold as well as a floor and a cliff while traveling a cleaning zone.

In the case of a wet mop cleaner currently commercially available, a mop cloth is attached to a spin mop when performing a wet mop cleaning, or a cleaning start command is applied in a state where a mop cloth is attached.

In the case of the wet mop cleaner, as the spin mop spins, the mop cloth also rotates to perform a wet mop cleaning for the floor. Further, the wet mop cleaner itself can be moved by the rotation speed and direction.

That is, it has a structure that can move according to the driving of spin mop without a separate wheel.

Thus, the attachment state of the mop cloth can have a great influence on the rotation of the spin mop itself.

For example, when the mop cloth is attached such that the center of the mop cloth and the center of the spin mop do not coincide with each other, the torque is not uniformly applied during the rotation of the spin mop so that moving in a desired direction does not proceed. Therefore, in the case of performing a pattern moving rather than a random moving, although the change of direction should be performed smoothly in the corner of the floor or in an area adjacent to the wall, it is not performed in such a manner. Accordingly, there is a disadvantage in that meticulous cleaning is difficult.

In addition, due to the rotation mismatch between the mop cloth and the spin mop, the area in which the mop cloth contacts the floor surface is not constant, so that the cleaning may be incompletely performed.

In addition, since the floor height of the entire mop cloth is not constantly adjusted during cleaning, the cleaner body may be shaken to cause damage to an apparatus itself. Therefore, in order to improve such a problem, detection of the attachment position of the mop cloth, an alarm to a user, and the like are required.

PRIOR ART DOCUMENT

Patent Document

Korean Patent Publication No. 1020040052094 (published. Jun. 19, 2004)

Korean Patent Publication No. 20140146702 (published Dec. 29, 2014)

Korean Patent Publication No. KR20090019480 (published. Feb. 25, 2009)

DISCLOSURE

Technical Problem

In a robot cleaner which is equipped with a mop cloth and performs traveling and cleaning simultaneously as a rotary mop rotates, the state of attachment of the mop cloth greatly affects the rotation of a spin mop itself.

Therefore, a first object of the present disclosure is to provide a control method of a robot cleaner that can detect whether a mop cloth is attached to a rotary mop to alert a user.

When additional sensors are added to detect whether the mop cloth is attached, cost may be increased and the volume of sensor module may obstruct the operation.

A second object of the present disclosure is to provide a method for determining whether a mop cloth is correctly attached by using sensing information of other sensors existing for driving without installing an additional sensor in the robot cleaner.

Apart from this, it also provides a control method of a robot cleaner capable of determining an exact attachment position of sensing cloth without calculation through a complicated algorithm by adding only a simple sensor capable of determining the position of sensing cloth.

Meanwhile, when the robot cleaner passes a bulky foreign matter placed on the floor during wet cleaning, it may occur that the foreign matter may be attached to a cleaning cloth due the viscosity of the foreign matter or water containing of cleaning cloth.

As described above, a third object of the present disclosure is to provide a control method of a robot cleaner that can alarm a user whether a foreign matter is detected, by periodically analyzing a detection value of a plurality of sensors, even when a foreign matter is attached to the bottom of the cleaning cloth.

In addition, while the robot cleaner performs wireless communication between a server and a user terminal, the user terminal can receive alarms and instructions on the current robot state, and accordingly, the robot cleaner can operate.

In this case, a fourth object of the present disclosure is to provide a robot cleaner that operates by sharing determination information on whether foreign matter is attached to the robot cleaner or cleaning cloth is incorrectly attached under a smart home system and receiving a corresponding command.

It provides a robot cleaner that can accurately change the direction during a pattern traveling through accurate situation determination on the cleaning cloth state of the robot cleaner and a corresponding control.

Another object of the present disclosure is to provide a control method of a robot cleaner that can protect the floor by preventing the proceeding of the wet mop cleaning in a state in which the mop is attached incorrectly.

The present disclosure is not limited to the above-mentioned problems, and other objects not mentioned will be clearly understood by those skilled in the art from the following description.

Technical Solution

According to an embodiment of the present disclosure, a robot cleaner of the present disclosure prevents the proceeding of the wet mop cleaning in a state in which the mop is attached incorrectly, thereby protecting the floor and proceeding with reliable cleaning.

To this end, the present disclosure periodically detects whether the mop cloth is correctly attached, and alert a user terminal in accordance with the detection result to induce the reattachment of the mop cloth and proceed with the wet cleaning.

The present disclosure provides a robot cleaner including: a main body configured to form an outer shape; a pair of rotary mop configured to move the main body while rotating in contact with a floor, and to perform cleaning by a mop cloth attached to a rotating plate of a lower portion; a drive motor configured to rotate the pair of rotary mop modules; a mop detecting unit configured to detect an incorrect attachment of the mop cloth attached to the rotating plate and output a detection signal; and a controller configured to determine the incorrect attachment of the mop cloth according to the detection signal from the mop detecting unit, and control driving of the rotary mop module.

The mop detecting unit may be disposed in a surplus space between the rotating plate and the main body to detect the existence of the mop cloth that is deviated from the rotating plate.

The mop detecting unit includes an image sensor disposed in the surplus space between two rotating plates.

The mop detecting unit includes two cliff sensors disposed in the surplus space between the rotating plate and a boundary surface below the main body, in the outside of the two rotating plates.

The controller detects a movement amount from the image sensor, and determines that the mop cloth is incorrectly attached when there is an area where the movement amount is periodically distorted.

The controller detects a floor distance from the cliff sensor, and determines that the mop cloth is incorrectly attached when the floor distance is distorted.

The controller may determine that there is a distortion in the floor distance when the graph for the floor distance detected from the cliff sensor is periodically decreased.

The controller periodically obtains an output current of the motor, and determines that an incorrect attachment of the mop cloth occurs when the output current is periodically increased.

The controller periodically obtains tilt angle information of the robot cleaner from a gyro sensor, and determines that an incorrect attachment of the mop cloth occurs when there is disturbance in the angle.

The controller may transmit information so as to alarm the user terminal when the mop cloth is incorrectly attached.

The controller may determine whether a foreign material is attached to the mop cloth based on the detection information of the image sensor and the cliff sensor.

When there is a variation in the detection information of any one of the image sensor and the cliff sensor, it is determined that the foreign matter is attached, when the variation occurs after a certain time is elapsed after the cleaning is started.

When a variation amount in the detection information is greater than or equal to a threshold value, removal of the foreign matter may be induced by alarming a user terminal.

Meanwhile, the present disclosure provides a robot system including: a robot cleaner configured to perform wet cleaning in a cleaning zone; a server configured to communicate with the robot cleaner and perform control of the robot cleaner; and a user terminal configured to be in association with the robot cleaner, and control the robot cleaner as an application for the control of the robot cleaner is activated, wherein the robot cleaner includes: a main body configured to form an outer shape; a pair of rotary mop configured to move the main body while rotating in contact with a floor, and to perform cleaning by a mop cloth attached to a rotating plate of a lower portion; a drive motor configured to rotate the pair of rotary mop modules; a mop detecting unit configured to detect an incorrect attachment of the mop cloth attached to the rotating plate and output a detection signal; and a controller configured to determine the incorrect attachment of the mop cloth according to the detection signal from the mop detecting unit, and control driving of the rotary mop module.

The mop detecting unit may be disposed in a surplus space between the rotating plate and the main body to detect the existence of the mop cloth that is deviated from the rotating plate.

The mop detecting unit includes an image sensor disposed in the surplus space between two rotating plates.

The mop detecting unit includes two cliff sensors disposed in the surplus space between the rotating plate and the main body, in the outside of the two rotating plates.

The controller detects a movement amount from the image sensor, and determines that the mop cloth is incorrectly attached when there is an area where the movement amount is periodically distorted.

The controller detects a floor distance from the cliff sensor, and determines that the mop cloth is incorrectly attached when the floor distance is distorted.

The controller may determine that there is a distortion in the floor distance when the graph for the floor distance detected from the cliff sensor is periodically decreased.

The controller periodically obtains an output current of the motor, and determines that an incorrect attachment of the mop cloth occurs when the output current is periodically increased.

The controller periodically obtains tilt angle information of the robot cleaner from a gyro sensor, and determines that an incorrect attachment of the mop cloth occurs when there is disturbance in the angle.

The controller may periodically receive a detection signal from the mop cloth detection unit, analyze the signal, determine the attachment state of the mop cloth, and transmit the detected signal to an application of the user terminal.

Specific details of other embodiments are included in the detailed description and the drawings.

Advantageous Effects

According to a robot cleaner of the present disclosure, there are one or more of the following effects.

The present disclosure can provide a control method of the robot cleaner that can alert the user by detecting whether the mop cloth is attached to the rotary mop.

In addition, a simple sensor device can be disposed to transmit a control signal. Thus, when using a wet mop robot cleaner, it is possible to protect the floor by preventing the mop cleaning to proceed in the state that there is no mop or the mop is incorrectly attached, by a simple device attachment.

Therefore, it is possible to accurately change the direction during a pattern traveling through accurate situation determination on the state of the cleaning cloth of the robot cleaner and a corresponding control, thereby performing meticulous cleaning through a pattern traveling cleaning.

Effects of the present disclosure are not limited to the above-mentioned effects, and other effects not mentioned will be clearly understood by those skilled in the art from the description of the claims.

MODE FOR INVENTION

Figure 1:
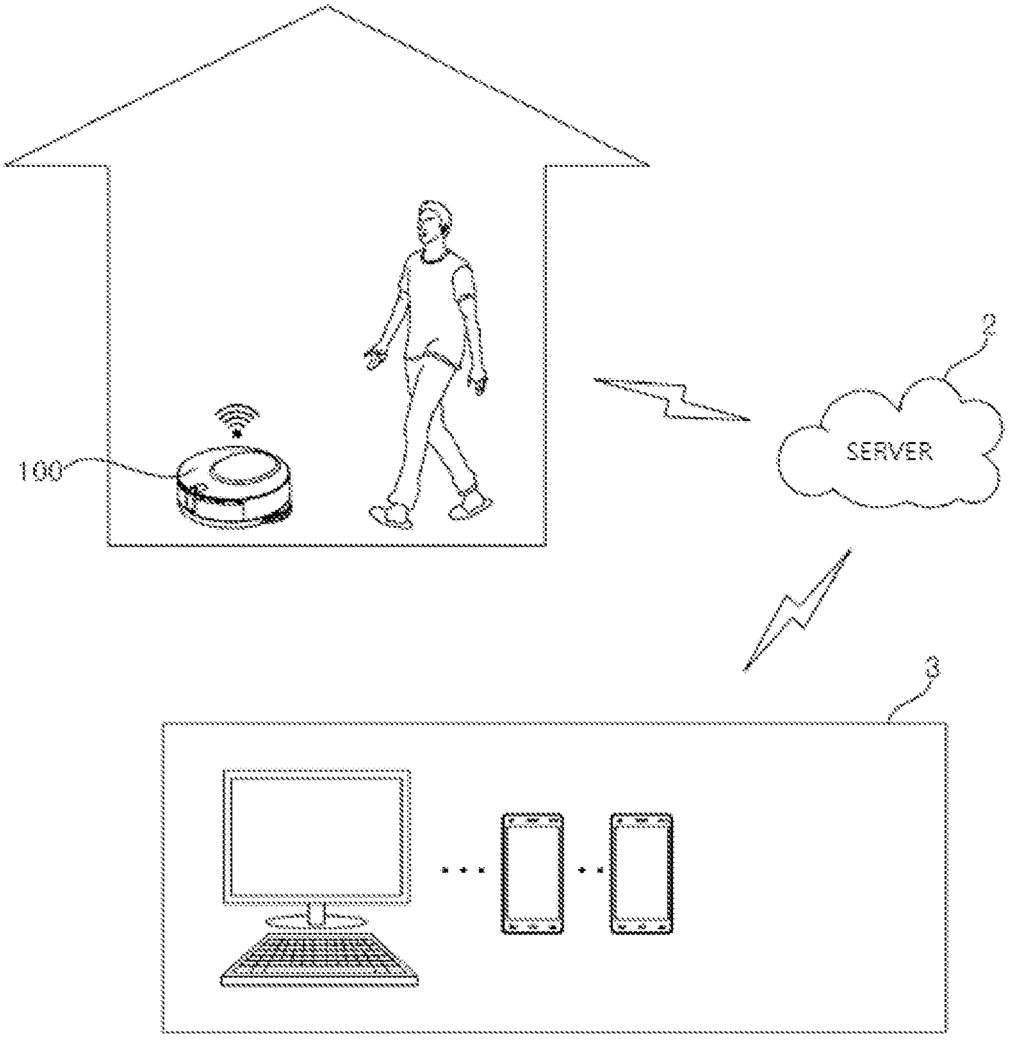
FIG. 1 is a configuration diagram of a smart home system including a home robot according to an embodiment of the present disclosure.

The expressions used in the following directions, such as "front(F)/rear(R)/left(Le)/right(Ri)/up(U)/down(D)", are defined as indicated in the drawings, but this is for the purpose of describing the present disclosure so that the present disclosure can be clearly understood, and it is obvious that directions can be defined differently according to where the reference is placed.

For example, a direction parallel to a virtual line connecting a central axis of a left rotary mop and a central axis of a right rotary mop is defined as a left and right direction, a direction which perpendicularly intersects with the left and right direction, parallel to the central axis of the rotary mops, or has an error angle within 5 degrees or less is defined as an up and down direction, and a direction which perpendicularly intersects the left and right direction and the up and down direction is defined as a front rear direction. Obviously, the front may mean a main traveling direction of the robot cleaner or a main traveling direction of a pattern traveling of the robot cleaner. Here, the main progress direction may mean a vector sum value of directions progressing within a certain time.

The use of the terms 'first, second', etc. in front of constituent element mentioned below is only to avoid confusion of a referred constituent element, and is not related to the order, importance or master-servant relationship between the constituent elements. For example, an invention including only a second constituent element without a first constituent element can be implemented.

In the drawings, the thickness or size of each constituent element is exaggerated, omitted, or schematically illustrated for convenience and clarity of description. In addition, the size and area of each constituent element does not entirely reflect the actual size or area.

In addition, the angle and direction mentioned in the process of explaining a structure of the present disclosure are based on what is described in drawing. In the description of the structure in the specification, if the reference point and the positional relationship with respect to the angle are not clearly mentioned, reference is made to related drawings FIG. 1 is a configuration diagram of a robot system according to an embodiment of the present disclosure.

Referring to FIG. 1, the robot system according to an embodiment of the present disclosure may include at least one robot cleaner 100 to provide a service at a prescribed place such as a house. For example, the robot system may include a robot cleaner 100 that provides a cleaning service at a designated place in a home or the like. In particular, the robot cleaner 100 may provide a dry, wet or dry/wet cleaning service according to a functional block included.

Preferably, the robot system according to an embodiment of the present disclosure may include a plurality of artificial intelligence robot cleaners 100 and a server 2 capable of managing and controlling the plurality of artificial intelligence robot cleaners 100.

The server 2 may remotely monitor and control the state of the plurality of robot cleaners 100, and the robot system may provide more effective service by using the plurality of robot cleaners 100.

The plurality of robot cleaners 100 and the server 2 may be provided with communication means (not shown) that support one or more communication standards, and may communicate with each other. In addition, the plurality of robot cleaners 100 and the server 2 may communicate with a PC, a mobile terminal, and another external server 2.

For example, the plurality of robot cleaners 100 and the server 2 may be implemented to wirelessly communicate with a wireless communication technology such as IEEE 802.11 WLAN, IEEE 802.15 WPAN, UWB, Wi-Fi, Zigbee, Z-wave, Blue-Tooth, etc. The communication scheme of the robot cleaner 100 may vary depending on the communication scheme of the other device or server 2 with which the robot cleaner 100 desires to communicate.

In particular, the plurality of robot cleaners 100 may implement wireless communication with other robot 100 and/or server 2 via 5G network. When the robot cleaner 100 wirelessly communicates through the 5G network, real time response and real time control can be achieved.

A user may check information on the robots 100 in the robot system through a user terminal 3 such as a PC or a mobile terminal.

The server 2 is implemented as a cloud server 2, the cloud server 2 is linked to the robot 100 to monitor and control the robot cleaner 100 and to remotely provide various solutions and contents.

The server 2 may store and manage information received from the robot cleaner 100 and other device. The server 2 may be a server 2 provided by a manufacturer of the robot cleaner 100 or a company to which the manufacturer has entrusted the service. The server 2 may be a control server 2 for managing and controlling the robot cleaner 100.

The server 2 may collectively control the robot cleaner 100 in the same manner, or may control the individual robot cleaners 100. Meanwhile, the server 2 may be configured by distributing information and functions to a plurality of servers, or may be configured as a single integrated server.

The robot cleaner 100 and the server 2 may be provided with communication means (not shown) that support one or more communication standards, and may communicate with each other.

The robot cleaner 100 may transmit a space, object, and usage-related data to the server 2.

Here, in the data, the space, object-related data may be data related to the recognition of the space and object recognized by the robot cleaner 100, or may be image data for the space and object obtained by the image acquisition unit.

According to an embodiment, the robot cleaner 100 and the server 2 may include artificial neural networks (ANN) in the form of software or hardware learned to recognize at least one of a property of an object such as a user, a voice, a property of a space, an obstacle, and the like.

According to an embodiment of the present disclosure, the robot cleaner 100 and the server 2 may include a deep neural network (DNN) such as convolutional neural network (CNN), recurrent neural network (RNN), deep belief network (DBN), and the like, which have been learned by deep learning. For example, the controller 140 of the robot cleaner 100 may be equipped with a deep neural network (DNN) structure such as a convolutional neural network (CNN).

The server 2 may allow the deep neural network (DNN) to learn, based on data received from the robot cleaner 100, data input by a user, and the like, and then transmit the updated deep neural network (DNN) structure data to the robot 1. Accordingly, the deep neural network (DNN) structure of artificial intelligence included in the robot 100 may be updated.

In addition, the usage-related data may be data obtained according to the use of the robot cleaner 100, and may correspond to usage history data, a detection signal obtained from a sensor unit, and the like.

The learned deep neural network (DNN) structure may receive input data for recognition, recognize attributes of person, object, and space included in the input data, and output the result.

In addition, the learned deep neural network (DNN) structure may receive input data for recognition, analyze and learn the usage-related data of the robot cleaner 100 to recognize the use pattern, the use environment, and the like.

Meanwhile, space, object, and usage-related data may be transmitted to the server 2 through the communication unit.

After the server 2 allows the deep neural network (DNN) to learn based on the received data, the server 2 may transmit the updated deep neural network (DNN) structure data to the artificial intelligence robot cleaner 100 to update it.

Accordingly, the robot 100 may become smarter and provide a user experience (UX) that evolves as it is used.

Meanwhile, the server 2 may provide information related to the control and the current state of the robot cleaner 100 to the user terminal, and it is possible to create and distribute an application for the control of the robot cleaner 100.

Such an application may be an application for a PC applied as the user terminal 3, or an application for a smart phone.

For example, it may be an application for controlling smart appliances, such as the SmartThinQ application, which is an application capable of simultaneously controlling and managing various electronic products of the applicant.

Figure 2:
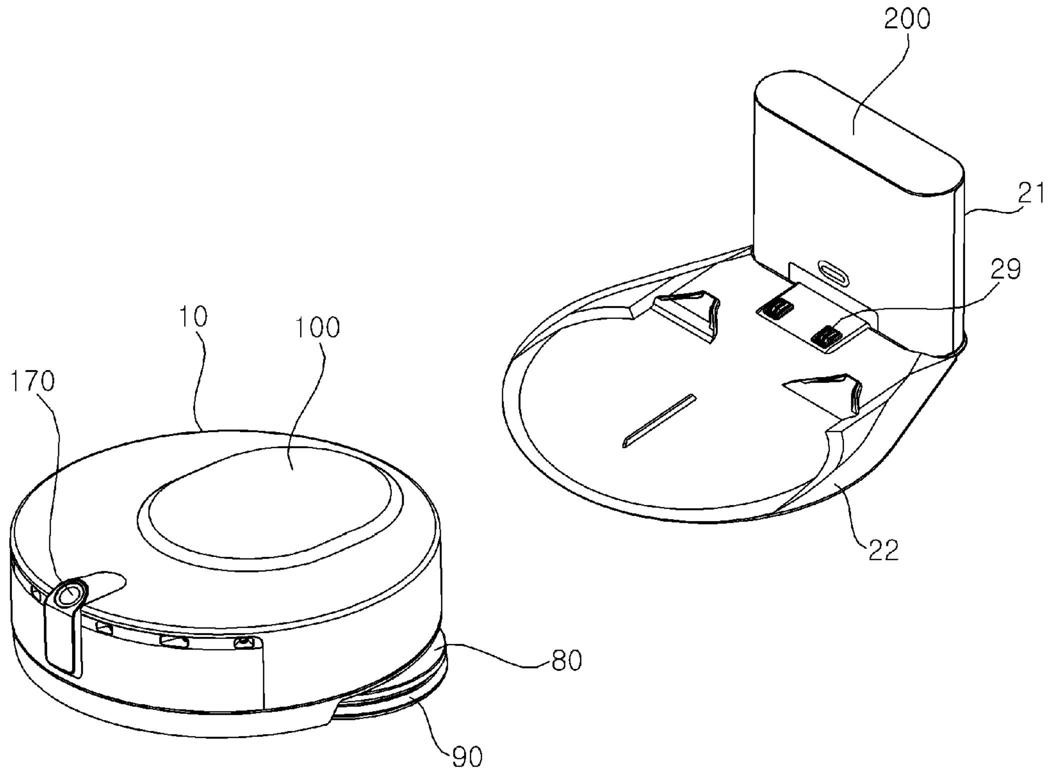
FIG. 2 is a perspective view of a robot cleaner according to an embodiment of the present disclosure.
Figure 3:
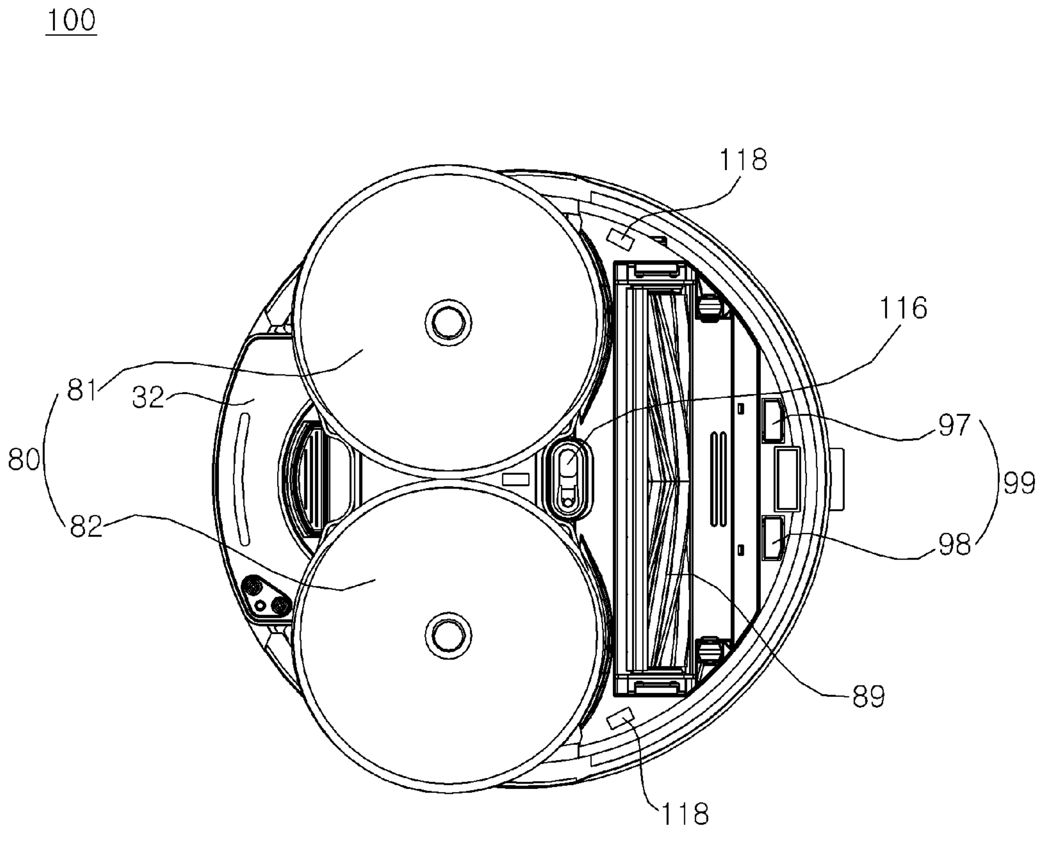
FIG. 3 is a bottom view of the robot cleaner of FIG. 2.
Figure 4:
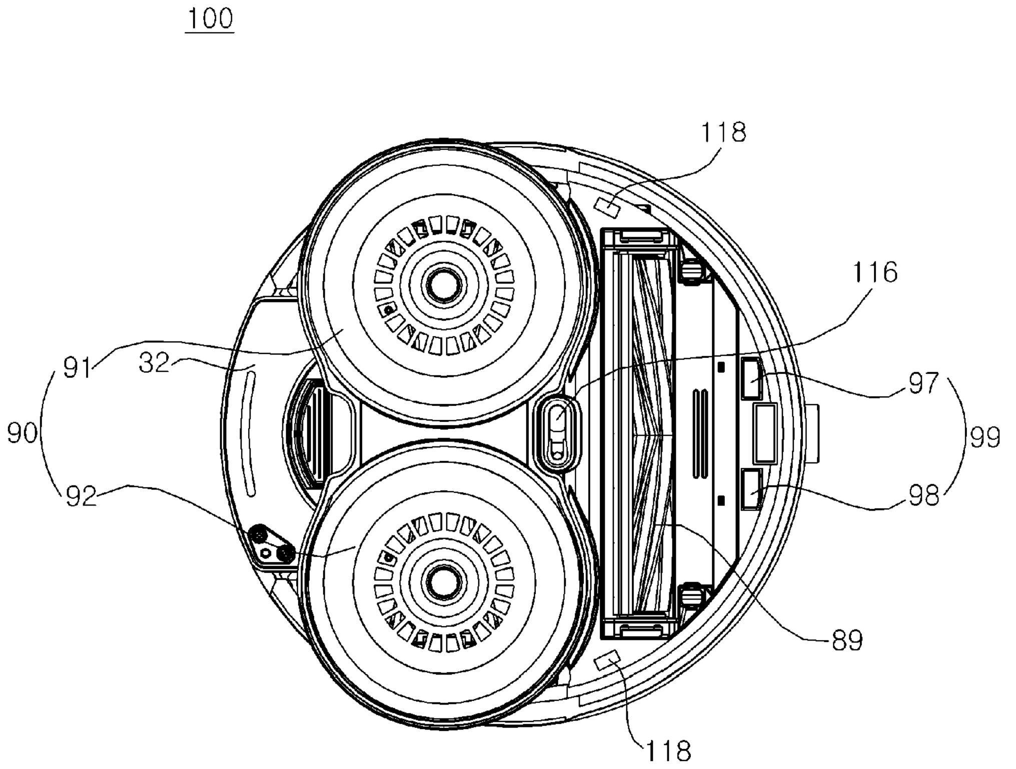
FIG. 4 is another state diagram of the bottom view of the robot cleaner of FIG. 3.

FIG. 2 is a perspective view of a robot cleaner according to an embodiment of the present disclosure, FIG. 3 is a bottom view of the robot cleaner of FIG. 2, and FIG. 4 is another state diagram of the bottom view of the robot cleaner of FIG. 3.

Referring to FIGS. 2 to 4, the configuration of the robot cleaner 100 in motion by the rotation of the rotary mop according to the present embodiment will be described briefly.

The robot cleaner 100 according to an embodiment of the present disclosure moves in a zone, and removes foreign matter on the floor during traveling.

In addition, the robot cleaner 100 stores the charging power supplied from a charging stand 200 in a battery (not shown) and travels the zone.

The robot cleaner 100 includes a main body 10 performing a designated operation, an obstacle detecting unit (not shown) which is disposed in the front surface of the main body 10 and detects an obstacle, and an image acquisition unit 170 photographing a 360 degree image. The main body 10 includes a casing (not shown) which forms an outer shape and forms a space in which components constituting the main body 10 are accommodated, a rotary mop 80 which is rotatably provided, a roller 89 which assists movement of the main body 10 and the cleaning, and a charging terminal 99 to which charging power is supplied from the charging stand 2.

The rotary mop 80 is disposed in the casing and formed toward the floor surface and the mop cloth is configured to be detachable.

The rotary mop 80 includes a first rotating plate 81 and a second rotating plate 82 to allow the body 10 to move along the floor of the zone through rotation.

When the rotary mop 80 used in the robot cleaner 100 of the present embodiment rotates, a slip may occur so that the robot cleaner 100 does not move in comparison with the actual rotation of the rotary mop. The rotary mop may include a rolling mop driven by a rotation axis parallel to the floor, or a spin mop driven by a rotation axis almost perpendicular to the floor.

When the rotary mop 80 includes the spin mop, the output current value of a drive motor for rotating the spin mop may vary according to a percentage of water content which is a ratio of contained water. The percentage of water content means the degree to which the spin mop contains water, and the state with a percentage of water content "0" means a state in which no water is contained in the spin mop. The percentage of water content according to the present embodiment may be set to a ratio containing water according to the weight of the mop cloth. The spin mop may contain water having the same weight as that of the mop, or may contain water in excess of the weight of the mop.

As the rotary mop 80 contains more water, the percentage of water content becomes higher, and the frictional force with the floor surface becomes greater due to the influence of water, thereby reducing the rotation speed.

The decrease in the rotation speed of the drive motor 38 means that the torque of the drive motor 38 is increased, thereby increasing the output current of the drive motor 38 for rotating the spin mop.

That is, a relationship that the output current of the drive motor 38 for rotating the spin mop is increased by the frictional force that is increased as the percentage of water content is increased is established.

In addition, the controller 150 may vary the output current of the drive motor 38 for a certain time to transmit various information. This will be described later.

The robot cleaner 100 according to the present embodiment may further include a water tank 32 which is disposed inside the main body 10 and stores water, a pump 34 for supplying water stored in the water tank 32 to the rotary mop 80, and a connection hose for forming a connection flow path connecting the pump 34 and the water tank 32 or connecting the pump 34 and the rotary mop 80.

The robot vacuum cleaner 100 according to the present embodiment includes a pair of rotary mops 80 and moves by rotating the pair of rotary mops 80.

The main body 10 travels forward, backward, left, and right as the first rotating plate 81 and the second rotating plate 82 of the rotary mop 80 rotate about a rotating shaft. In addition, as the first and second rotating plates 81 and 82 rotate, the main body 10 performs wet cleaning as foreign matter on the floor surface is removed by the attached mop cloth.

The main body 10 may include a driving unit (not shown) for driving the first rotating plate 81 and the second rotating plate 82. The driving unit may include at least one drive motor 38.

The upper surface of the main body 10 may be provided with a control panel including an operation unit (not shown) that receives various commands for controlling the robot cleaner 100 from a user.

In addition, the image acquisition unit 170 is disposed in the front or upper surface of the main body 10.

The image acquisition unit 170 captures an image of an indoor area.

On the basis of the image captured by the image acquisition unit 170, it is possible to detect obstacles around the main body as well as to monitor the indoor area.

The image acquisition unit 170 may be disposed toward the front and upper direction at a certain angle to photograph the front and the upper side of the moving robot. The image acquisition unit 170 may further include a separate camera for photographing the front. The image acquisition unit 170 may be disposed above the main body 10 to face a ceiling, and in some cases, a plurality of cameras may be provided. In addition, the image acquisition unit 170 may be separately provided with a camera for photographing the floor surface.

The robot cleaner 100 may further include position obtaining means (not shown) for obtaining current position information. The robot cleaner 100 may include GPS and UWB to determine the current position. In addition, the robot cleaner 100 may determine the current position by using the image.

The main body 10 includes a rechargeable battery (not shown), and a charging terminal 99 of the battery may be connected to a commercial power source (e.g., a power outlet in a home) or the main body 10 may be docked to the charging stand 200 connected to the commercial power source, so that the charging terminal may be electrically connected to the commercial power source through contact with a terminal 29 of the charging stand and the battery may be charged by the charging power supplied to the main body 10.

The electric components constituting the robot cleaner 100 may be supplied with power from a battery, and thus, the robot cleaner 100 may automatically move in a state in which the robot cleaner 100 is electrically separated from commercial power.

Hereinafter, it will be described on the assumption that the robot cleaner 100 is a wet cleaning moving robot. However, the robot cleaner 100 is not limited thereto and it should be noted that any robot that detects sound while autonomously traveling a zone can be applicable.

FIG. 4 is a diagram illustrating an embodiment in which a mop cloth is attached to the moving robot of FIG. 2.

As shown in FIG. 4, the rotary mop 80 includes a first rotating plate 81 and a second rotating plate 82.

The first rotating plate 81 and the second rotating plate 82 may be provided with attached mop cloth 90(91, 92), respectively.

The rotary mop 80 is configured such that mop cloth 90(91, 92) can be detachable. The rotary mop 80 may have a mounting member for attachment of the mop cloth 90(91, 92) provided in the first rotating plate 81 and the second rotating plate 82, respectively. For example, the rotary mop 80 may be provided with a velcro, a fitting member, or the like so that the mop cloth 90(91, 92) can be attached and fixed. In addition, the rotary mop 80 may further include a mop cloth frame (not shown) as a separate auxiliary means for fixing the mop cloth 90(91, 92) to the first rotating plate 81 and the second rotating plate 82.

The mop cloth 90 absorbs water to remove foreign matter through friction with the floor surface. The mop cloth 90 is preferably a material such as cotton fabric or cotton blend, but any material containing moisture in a certain ratio or higher and having a certain density can be used, and the material is not limited.

The mop cloth 90 is formed in a circular shape.

The shape of the mop cloth 90 is not limited to the drawing and may be formed in a quadrangle, polygon, or the like. However, considering the rotational motion of the first and second rotating plates 81 and 82, it is preferable that the first and second rotating plates 81 are configured in a shape that does not interfere with the rotation operation of the first and second rotating plates 81 and 82. In addition, the shape of the mop cloth 90 can be changed into a circular shape by the mop cloth frame provided separately.

The rotary mop 80 is configured such that when the mop cloth 90 is mounted, the mop cloth 90 comes into contact with the floor surface. Considering the thickness of the mop cloth 90, the rotary mop 80 is configured to change a separation distance between a casing and the first and second rotating plates 81 and 82 according to the thickness of the mop cloth 90.

The rotary mop 80 adjusts the separation distance between the casing and the rotating plate 81, 82 so that the mop cloth 90 comes in contact with the floor surface, and the rotating plate 81, 82 includes a mop fixing part (not shown) for fixing the mop cloth 90. The mop fixing part may fix the mop cloth 90 in a detachable manner. The mop fixing part may be a velcro or the like disposed below the rotating plate 81, 82. The mop fixing part may be a hook or the like disposed in the edge of the rotating plate 81, 82.

Various mop cloth detection sensors for detecting the current error state of the mop cloth 90 are provided in the floor surface of the robot cleaner 100 on which the mop cloth 90 and the rotating plates 81 and 82 are disposed.

Such an error state of the mop cloth 90 may be representatively defined as whether the mop cloth is incorrectly attached or the foreign matter is attached to the mop cloth 90.

Such a mop cloth sensor, as shown in FIG. 3, is a distance sensor disposed in a surplus space between the two rotating plates 81 and 82, and includes an image sensor 116.

The surplus space may be defined as a space below the main body 10 in which the rotary mop 80 is disposed below the main body 10 and exposed around the rotating plate 81, 82.

Thus, the surplus space may be a lower surface of the main body 10 exposed between the two rotating plates 81 and 82, and alternatively, may be a lower surface of the main body 10 exposed from the boundary of the rotating plates 81 and 82 to the boundary formed by the side surface and the lower surface of the main body 10, as the outside of each rotating plate 81 and 82. The image sensor 116 is implemented to detect a moving distance through continuous shooting of a moving area, but can determine whether the mop cloth 90 has an error by analyzing the detection signal of the image sensor 116. In addition, the robot cleaner 100 may use an encoder (not shown) that detects a moving distance of the robot cleaner 100 in addition to the image sensor 116.

In addition, as a mop cloth sensor, the robot cleaner 100 may further include a cliff sensor 118 for detecting the existence of a cliff on the floor in the cleaning zone. The cliff sensor 118 according to the present embodiment may be disposed below the robot cleaner 100. That is, as shown in FIG. 4, the robot cleaner 100 may be disposed in a surplus area between each rotating plate 81, 82 below the robot cleaner 100 and the main body 10. Accordingly, two cliff sensors 118 are formed in the outer surplus area of each of the rotating plates 81 and 82, and the front side is not obscured by the rotating plates 81 and 82, but may be very closely disposed so that the state of being obscured depending on whether the mop cloth 90 is attached may be maintained.

When including the cliff sensor 118, the controller 150 may determine the material of the floor based on the amount of light which is output from the light emitting device and reflected from the floor and is received by the light receiving device, but is not limited thereto.

As described above, a mop cloth sensor that can detect whether the mop cloth 90 sensor is currently in an error state is disposed in a surplus zone around the rotating plate 81, 82 to which the mop cloth 90 is attached, thereby periodically determining the error state of the mop cloth 90 according to a detection signal from the mop cloth sensor.

Specifically, the controller 150 obtains and fuses the detection signal of various sensors, in addition to the mop cloth sensor disposed below the robot cleaner 100, thereby determining whether the mop cloth 90 is accurately fixed to the rotating plate 81, 82.

Figure 5:
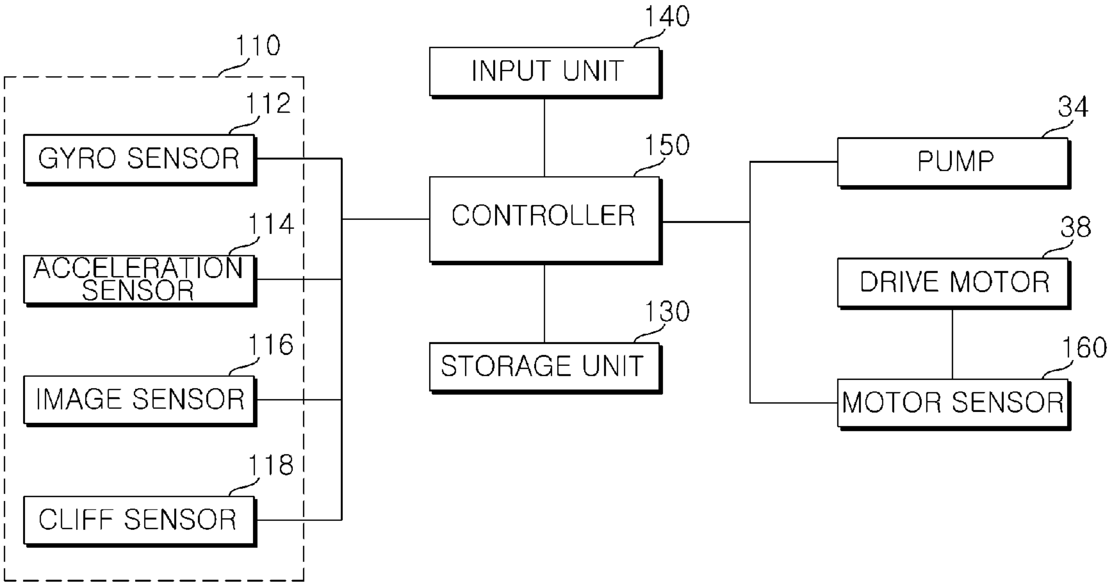
FIG. 5 is a block diagram illustrating a controller of a robot cleaner and a configuration related to the controller according to an embodiment of the present disclosure.

FIG. 5 is a block diagram illustrating a controller of a robot cleaner and a configuration related to the controller according to an embodiment of the present disclosure.

The robot cleaner 100 according to the present embodiment further includes a motion detection unit 110 that detects the motion of the robot cleaner 100 according to the reference motion of the main body 10 when the rotary mop 80 rotates. The motion detection unit may further include a gyro sensor 112 that detects the rotation speed and the tilt of the robot 10 or an acceleration sensor 114 for detecting an acceleration value of the robot cleaner 100.

The robot cleaner 100 according to the present embodiment includes a motor sensor 160 that reads an output current of the drive motor 38 that rotates the rotary mop 80 and transmits to the controller 150.

When transmitting a current for rotating the drive motor 38 according to a start signal of the controller 150, the motor sensor 160 reads the output current of the drive motor 38 according to a set period and transmits to the controller 150.

The controller 150 may receive an output current from the motor sensor 160 and analyze the output current to determine the current error state of mop cloth 90.

The controller 150 may determine the error state of the mop cloth 90 of the spin mop of the rotary mop 80 according to the value of the output current of the drive motor 38.

Each data value for such an output current value may be set experimentally, and may be updated by performing learning through artificial intelligence.

In addition, the controller 150 may read a tilt from the gyro sensor 112 to determine an error state of the mop cloth 90.

The controller 150 may control the operation of the robot cleaner 100 according to various sensors, thereby enabling selective driving according to whether the mop cloth 90 is incorrectly attached.

The robot cleaner 100 according to the present embodiment may further include an input unit 140 for inputting a user's command. The user may set, through the input unit 140, a driving method of the robot cleaner 100, or a threshold value or the like for sensing signals of a plurality of sensors for the incorrect attachment of mop cloth 90 of the spin mop.

In addition, the robot cleaner 100 may further include a communication unit, and may provide alarm or information according to the determination result of the controller 150 to the server 2 or the user terminal 3 through the communication unit.

FIG. 6 is a diagram for explaining the motion of the robot cleaner 100 according to an embodiment of the present disclosure, and the traveling of the robot cleaner 100 and the movement of the robot cleaner 100 according to the rotation of the rotary mop will be explained with reference to FIG. 6.

The robot cleaner 100 according to the present embodiment includes a pair of rotary mops, and moves by rotating the pair of rotary mops. The robot cleaner 100 may control the traveling of the robot cleaner 100 by varying the rotation direction or the rotation speed of each of the pair of rotary mops. Therefore, pattern traveling can be accomplished through such a control.

Figure 6A:
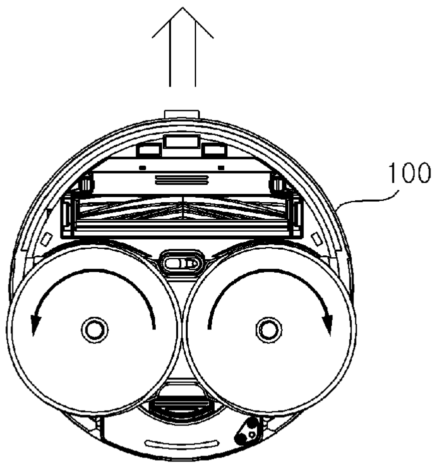
FIGS. 6A to 6C are diagrams for explaining the rotation of a spin mop when a robot cleaner moves according to an embodiment of the present disclosure.

Referring to FIG. 6A, the robot cleaner 100 may move in a straight line by rotating the pair of rotary mops in opposite directions. In this case, the rotation speed of each of the pair of rotary mops is the same, but the rotation direction is different. The robot cleaner 100 may move forward or backward by changing the rotation direction of both rotary mops.

Figure 6B:
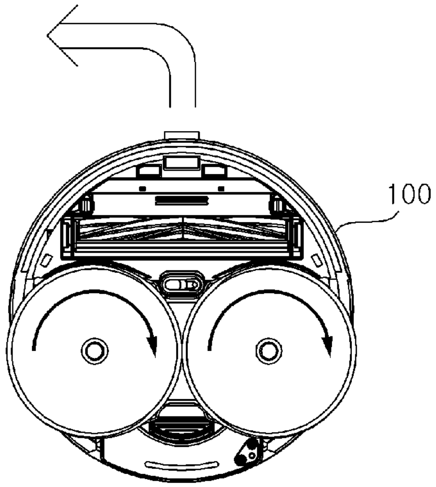
Figure 6C:
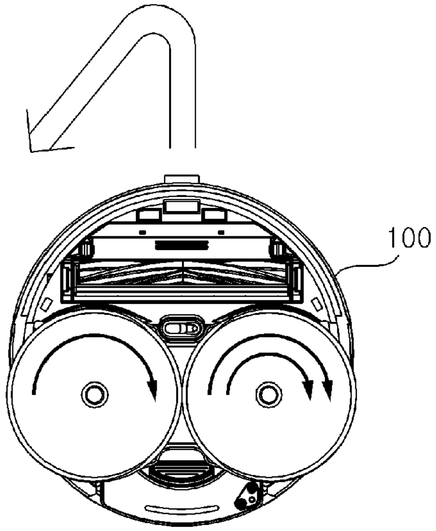

In addition, referring to FIGS. 6*b* and 6*c*, the robot cleaner 100 may rotate by rotating each of the pair of rotary mops in the same direction. The robot cleaner 100 may rotate in place by varying the rotation speed of each of the pair of rotary mops, or perform a round rotation that moves in a curve. The radius of the round rotation can be adjusted by varying the rotation speed ratio of each of the pair of rotary mops of the robot cleaner 100.

Meanwhile, as described above, the robot cleaner attaches the detachable mop cloth 90 to the rotating plate to perform cleaning.

At this time, the mop cloth may be incorrectly attached in various cases as shown in FIGS. 7A to 7D.

In the case of such an incorrect attachment, a part of the front of the image sensor 116 or the cliff sensor 118 disposed below the robot cleaner 100 may be hindered, and thus, a change may occur in an obtained detection signal.

Figure 7A:
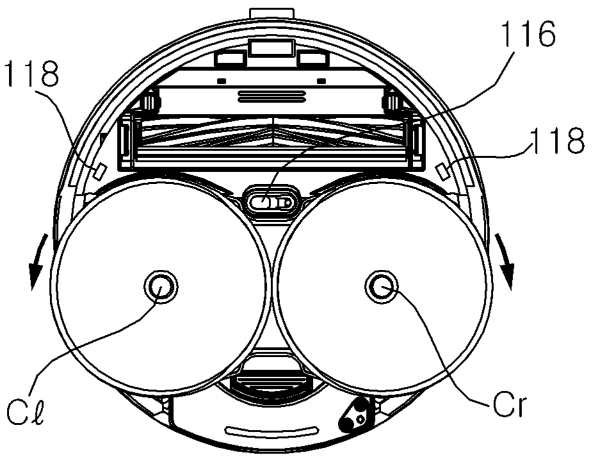
FIGS. 7A to 7D illustrate various examples of an incorrect attachment of mop cloth of the present disclosure.

Specifically, as shown in FIG. 7A, center points Cl, Cr of respective rotating plates 81, 82 are designated, and thus center points 93, 94 of respective cloth mops 90(91, 92) are also defined.

When attaching the mop cloth 90(91, 92), it is preferable that the center points 93 and 94 of the mop cloths 90(91, 92) and the center points Cl and Cr of the rotating plates 81 and 82 are overlapped.

That is, as shown in FIG. 7A, when the center points 93 and 94 of the mop cloth 90(91, 92) and the center points Cl and Cr of the rotating plates 81 and 82 overlap with each other, any area of the image sensor 116 or the cliff sensor 118 is not hindered but completely exposed.

Figure 7B:
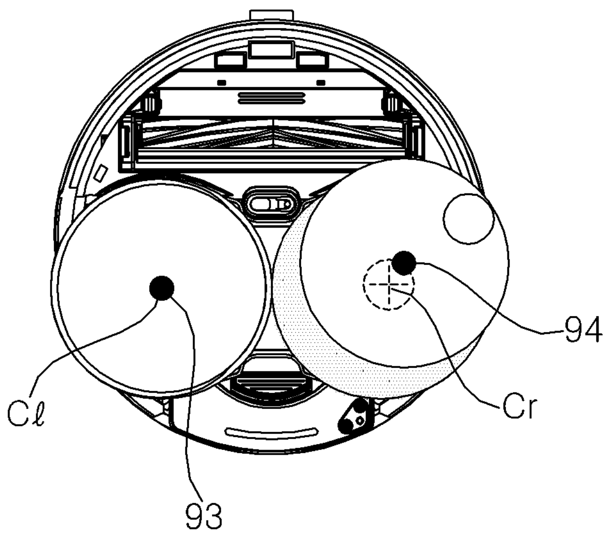
Figure 7C:
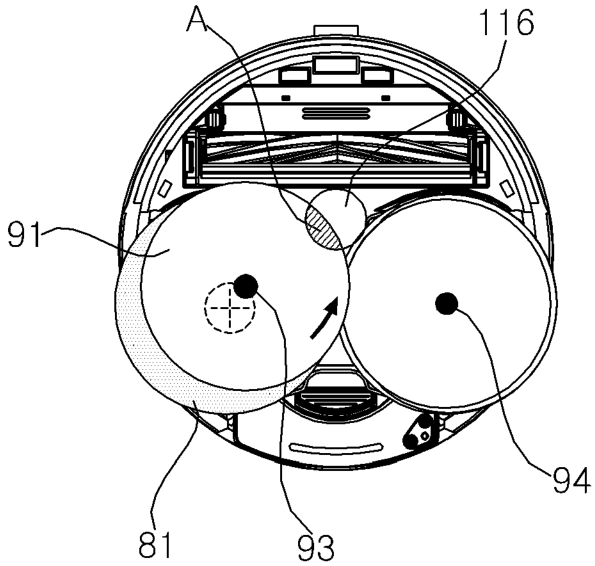

However, the center points Cl and Cr of any one of the rotating plates 81 and 82 and the center points 93 and 94 of the mop cloths 90(91, 92) do not overlap as shown in FIGS. 7B and 7C, and when the center points 93 and 94 of the mop cloths 90(91, 92) deviate outwardly as shown in FIG. 7A, a part of the outer cliff sensor 118 may be hindered.

Alternatively, as shown in FIG. 7C, when the center points 93 and 94 of the mop cloths 90(91, 92) deviate inwardly, a part of the image sensor 116 positioned between the two rotating plates 81 and 82 may be hindered.

Figure 7D:
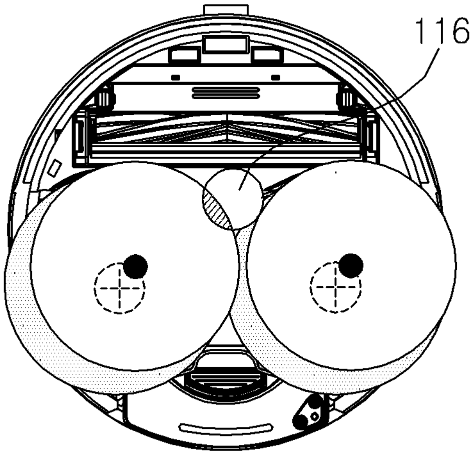

Alternatively, as shown in FIG. 7D, when both of the center points 93 and 94 of the two mop cloths 90(91, 92) are not overlapped with the center points Cl and Cr of the rotating plates 81 and 82, both the cliff sensor 118 disposed in a surplus space between the rotating plate and a boundary surface below the main body, in the outside of the two rotating plates and the image sensor 116 in the outside of the two rotating plates are hindered in partial field of view.

The controller 150 may detect a change in the detection signal due to the hindrance of the mop cloth sensor and determine whether the mop cloth 91, 92 is incorrectly attached.

Hereinafter, referring to FIG. 8, a method of determining whether the mop cloth 91, 92 of the robot cleaner 100 according to the present embodiment is incorrectly attached will be described.

Figure 8:
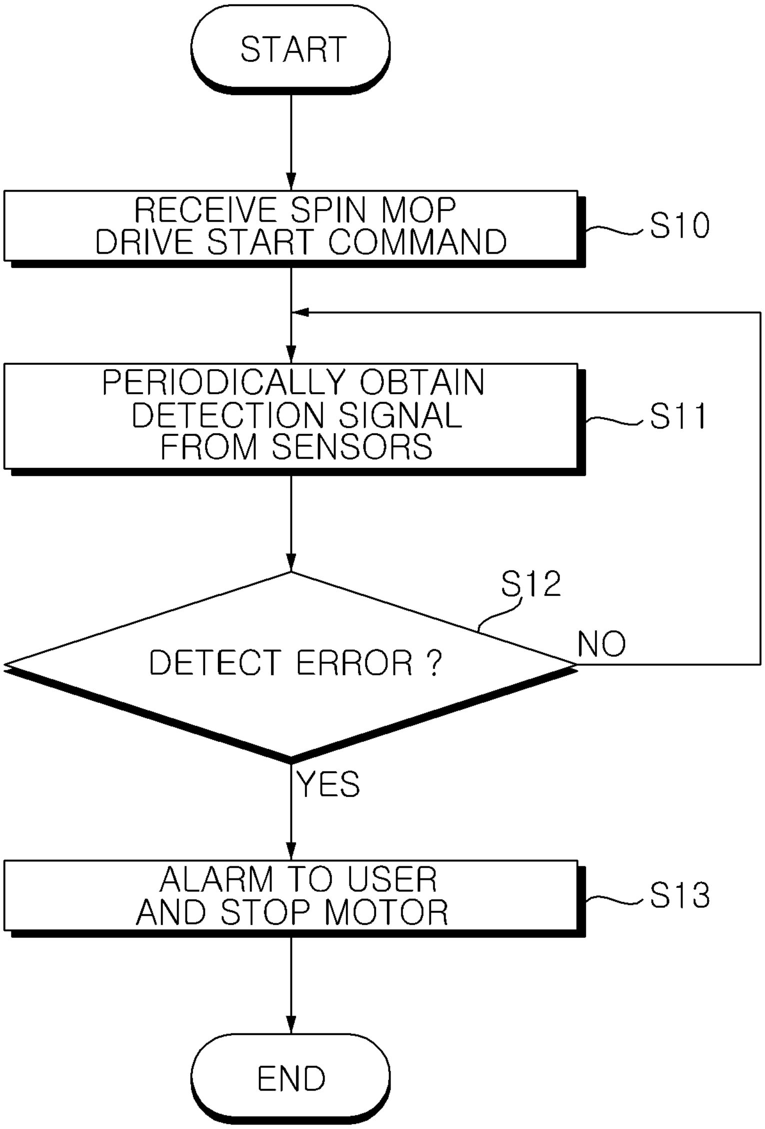
FIG. 8 is a flowchart illustrating a method of controlling a robot cleaner according to an embodiment of the present disclosure.

FIG. 8 is a flowchart illustrating a method of controlling a robot cleaner 100 according to an embodiment of the present disclosure.

Referring to FIG. 8, the robot cleaner 100 according to the present embodiment may receive a cleaning start command from an application of the server 2 or the user terminal 3. In addition, the robot cleaner 100 may receive a cleaning start command through the input unit 140 directly from a user (S10).

The controller 150 of the robot cleaner 100 controls the drive motor 38 and the pump through the motor controller 160 to start cleaning according to the received cleaning start command.

The controller 150 proceeds with traveling and cleaning while rotating the spin mop. The spin mop also performs wet cleaning in a state of including a certain percentage of water content according to water spray from a nozzle due to driving of the pump 34.

In this case, the controller 150 may proceed with the cleaning intensity and the traveling by controlling the rotation direction and the rotation speed of the spin mop, and perform cleaning while traveling in a certain mode according to the cleaning zone.

In this case, the controller 150 may periodically obtain a detection signal from a plurality of sensors, specifically, a mop cloth sensor, a spin mop motor sensor, a gyro sensor, and the like (S11).

The controller 150 may obtain a detection signal from the image sensor 116 and the cliff sensor 118 which are the mop cloth sensor at certain cycles, and obtain the detection signal from the motor sensor 160 and the gyro sensor 112, thereby determining whether an error occurs in the attachment of the mop cloth 91 and 92 (S12).

The controller 150 receives the detection signal of each sensor received according to each cycle, and analyzes the detected signal to determine whether the mop cloth 91, 92 is correctly attached to the spin mop.

That is, it is possible to determine the attachment error of the mop cloth 91 and 92 by determining whether the detection signal of each sensor is distorted.

At this time, when it is determined that distortion has occurred in the detection signal from one of the plurality of sensors, a control signal is transmitted to alert the user terminal 3 and stop the motor (S13).

Therefore, it is possible to stop at the current position without further proceeding with the cleaning in the state where the mop cloth 91, 92 is incorrectly attached.

Hereinafter, a process of determining the detection signal of each sensor for the incorrect attachment of the mop cloth 91, 92 of the present disclosure will be described in more detail with reference to FIG. 9.

Figure 9:
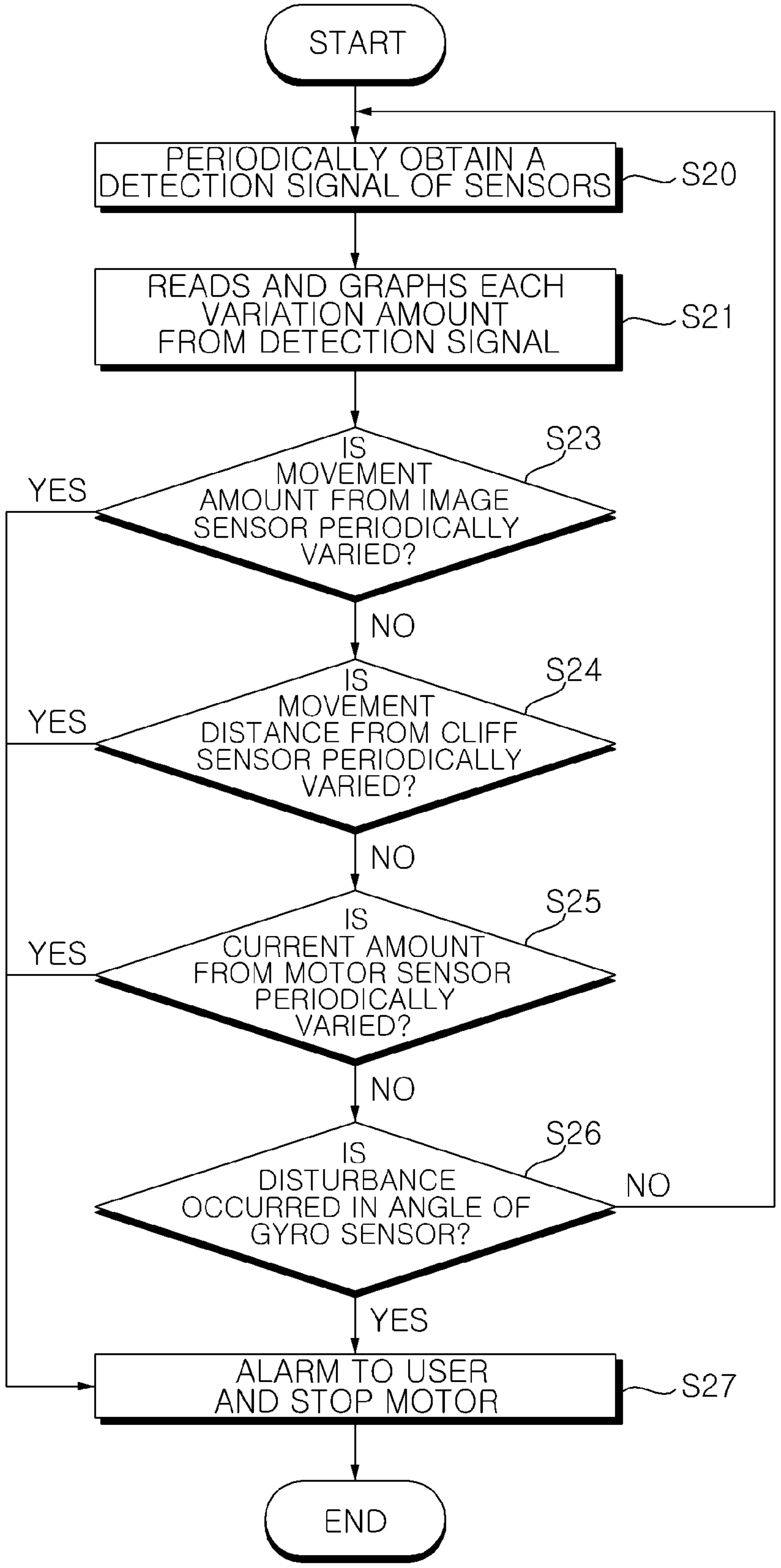
FIG. 9 is a flowchart illustrating a method of controlling a robot cleaner according to another embodiment of the present disclosure.

Referring to FIG. 9, the robot cleaner 100 according to the present embodiment may receive a cleaning start command from an application of the server 2 or the user terminal 3. In addition, the robot cleaner 100 may receive a cleaning start command through the input unit 140 directly from the user.

The controller 150 proceeds with traveling and cleaning while rotating the spin mop. The spin mop also performs wet cleaning in a state of including a certain percentage of water content according to water spray from a nozzle due to driving of the pump 34.

In this case, the controller 150 may proceed with the cleaning intensity and the traveling by controlling the rotation direction and the rotation speed of the spin mop, and perform cleaning while traveling in a certain mode according to the cleaning zone.

In this case, the controller 150 may periodically obtain a detection signal from a plurality of sensors, specifically, a mop cloth sensor, a spin mop motor sensor 160, a gyro sensor 112, and the like (S20).

The controller 150 may obtain a detection signal from the image sensor 116 and the cliff sensor 118 which are the mop cloth sensor at certain cycles, and obtain the detection signal from the motor sensor 160 and the gyro sensor 112, thereby determining whether an error occurs in the attachment of the mop cloth 91 and 92.

That is, the controller reads and graphs each variation amount in order to represent a signal waveform from the detection signal from each sensor (S21).

As described above, the graph of the detection signal of each sensor may be as shown in FIGS. 10A to 13D.

Figure 10A:
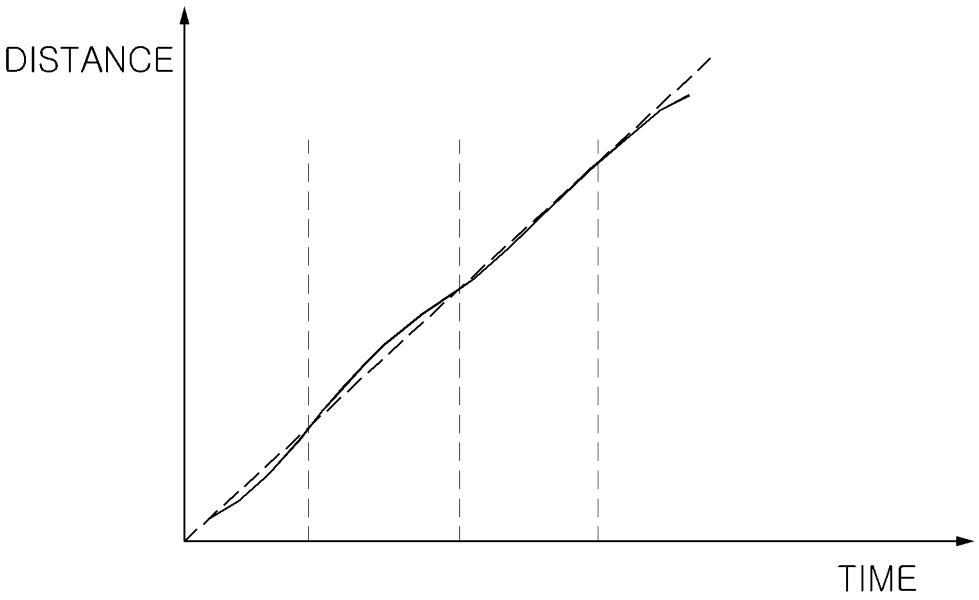
FIGS. 10A and 10B are graphs illustrating a detection signal of an image sensor according to an incorrect attachment of mop cloth.
Figure 10B:
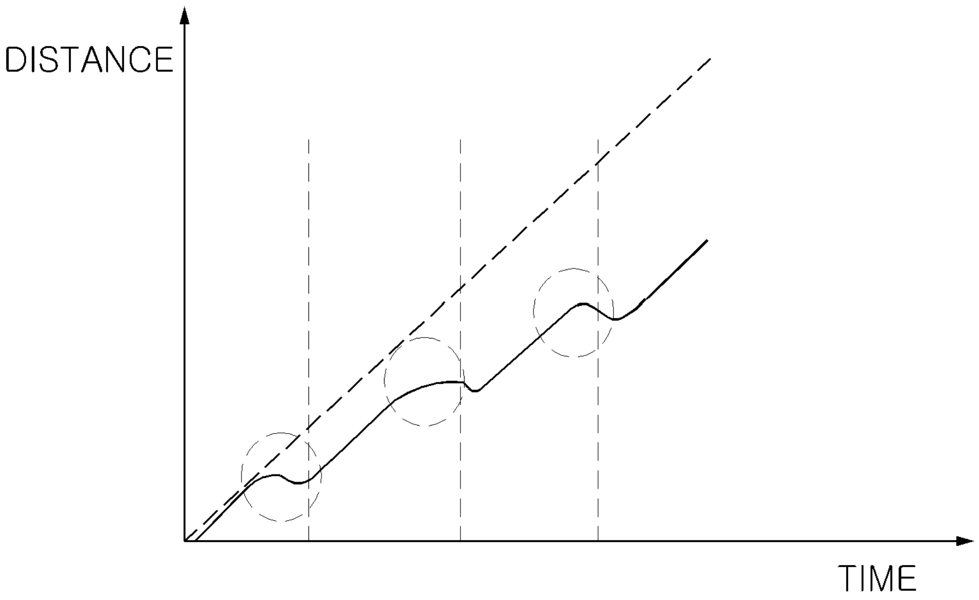
Figure 11A:
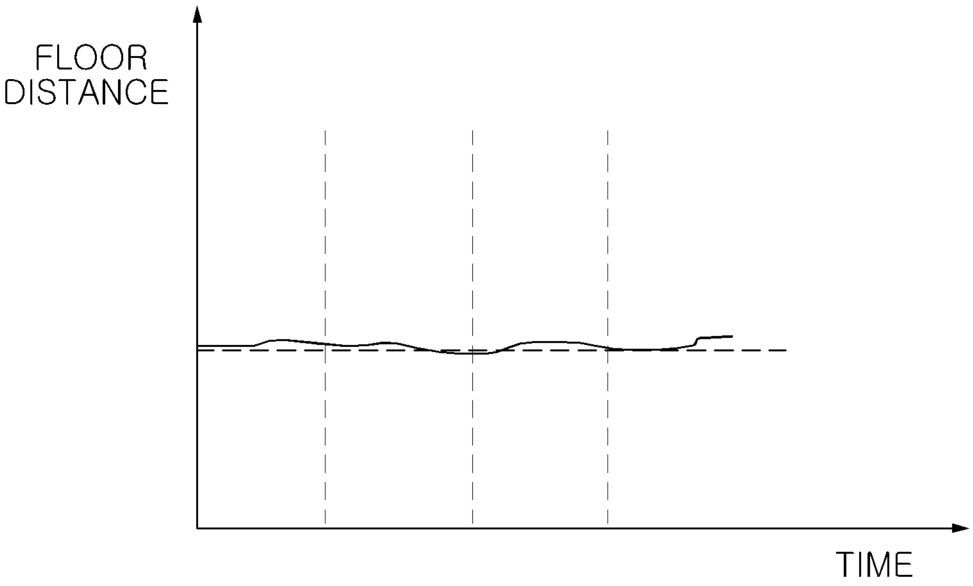
FIGS. 11A and 11B are graphs illustrating a detection signal of a cliff sensor according to an incorrect attachment of mop cloth.
Figure 11B:
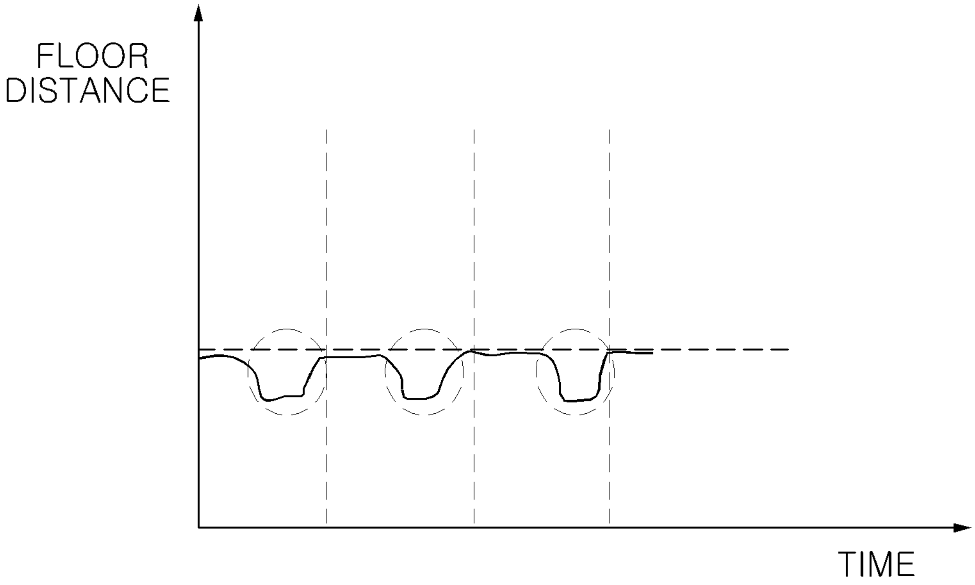
Figure 12A:
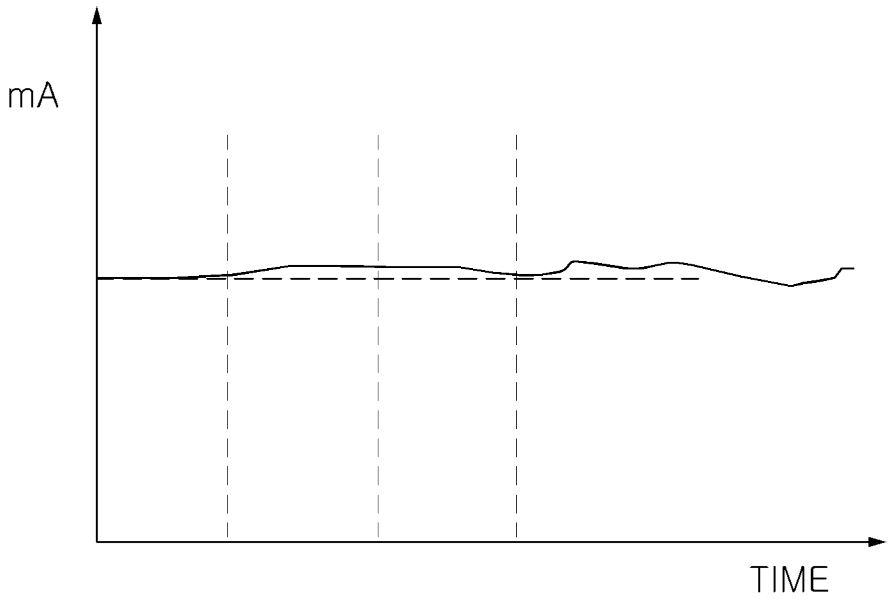
FIGS. 12A and 12B are graphs illustrating a detection signal of a motor sensor according to an incorrect attachment of mop cloth.
Figure 12B:
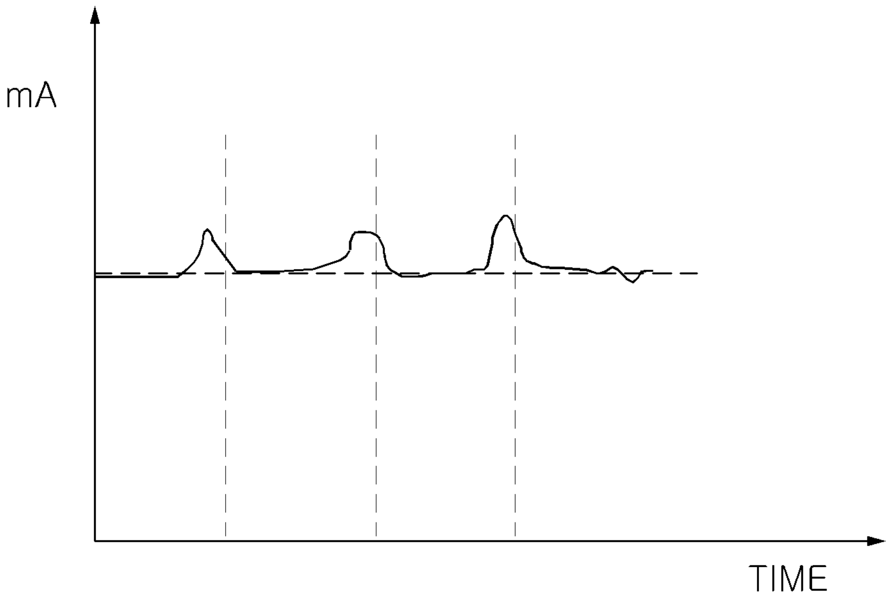
Figure 13A:
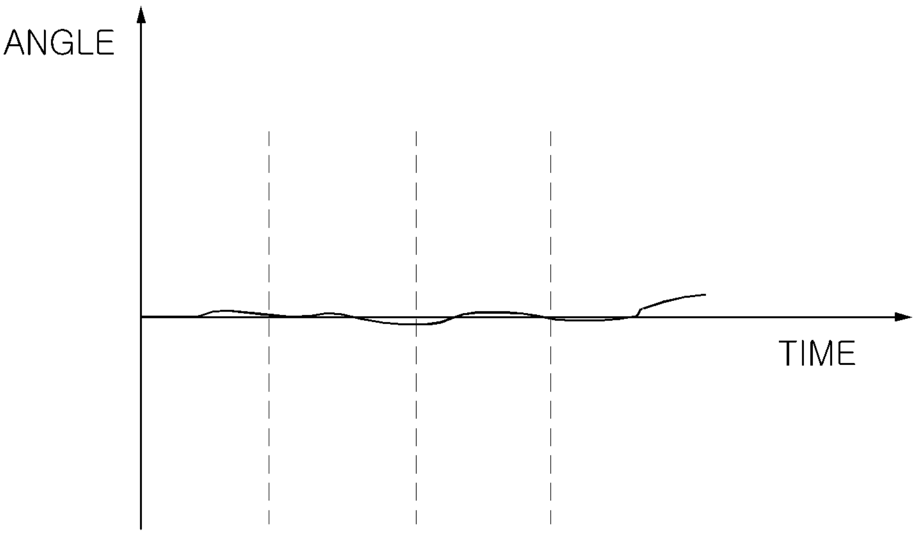
FIGS. 13A and 13B are graphs illustrating a detection signal of a tilt sensor according to an incorrect attachment of mop cloth.
Figure 13B:
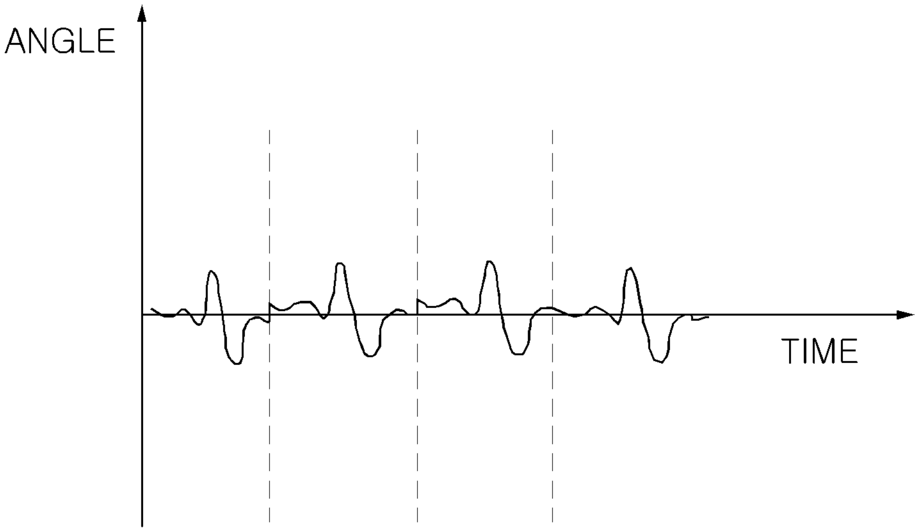

FIGS. 10A and 10B are graphs illustrating a detection signal of an image sensor 116 according to an incorrect attachment of mop cloth, FIGS. 11A and 11B are graphs illustrating a detection signal of a cliff sensor 118 according to an incorrect attachment of mop cloth, FIGS. 12A and 12B are graphs illustrating a detection signal of a motor sensor according to an incorrect attachment of mop cloth, and FIGS. 13A and 13B are graphs illustrating a detection signal of a tilt sensor according to an incorrect attachment of mop cloth.

The graph A in each drawing shows a detection signal in the case where the mop cloths 91 and 92 are correctly attached, i.e. the case where the center points 93 and 94 of the mop cloths 91 and 92 in both sides are coincide with the center points Cl and Cr of the rotating plates 81 and 82.

The graph B in each drawing shows a graph of the detection signal in the situation of FIGS. 7B to 7D, when the mop cloths 91 and 92 are not correctly attached.

The controller 150 determines whether there is an error of the detection signal, that is, whether there is distortion of the detection signal, while reading each graph.

First, the controller 150 determines whether the distance value is periodically distorted from the movement amount graph from the image sensor 116 (S23).

That is, when the mop cloth 91, 92 is not correctly attached as shown in FIG. 10B, as indicated by the dotted line, there occurs a distortion section in which the movement amount periodically slows down, stops, and retracts in a constant speed forward movement.

In this distortion phenomenon, the distortion of the movement amount may be periodically detected in comparison with the expected converted position during the intended motion operation such as the rotation in place instead of the forward movement.

At this time, when the forward movement direction is x, the distance in the forward movement direction is reduced than the actual distance, which can be recognized as a periodic speed reduction phenomenon in the x direction despite the constant rotation of the rotating plates 81, 82.

In addition, the periodic speed reduction in the y direction may also be recognized, and an abnormal amount of movement in the y direction occurs. Thus, the amount of movement in the y direction may be periodically detected as an abnormal amount of movement, which may be detected as distortion in FIG. 10B individually or complexly.

As described above, when a distortion, i.e. a periodic inflection point, occurs, according to the movement amount graph from the image sensor 116 which is periodically read, the user terminal 3 is alerted and the motor 38 is stopped at the current position and does not move any longer (S27).

Thus, the user can be alerted to induce reattachment of the mop cloths 91 and 92.

Meanwhile, the controller 150 may indicate a graph of distance variation from the floor from the detection signal from the cliff sensor 118 as shown in FIGS. 11A and 11B. Based on this, the controller 150 determines whether the floor distance value is periodically distorted (S24).

In a normal floor condition as shown in FIG. 11A, it is possible to maintain a constant value without significant variations in the floor distance according to the rotational traveling of the spin mop.

Meanwhile, when the mop cloth 91, 92 is not correctly attached as shown in FIG. 11B, as indicated by the dotted line, the mop cloth 91, 92 periodically interferes with the cliff sensor 118 during the constant speed rotation, so that it is shown that the floor distance value is periodically reduced.

In this distortion phenomenon, the distortion of the floor distance may be periodically detected in comparison with the expected converted position during the intended motion operation such as the rotation in place instead of the forward movement.

As described above, when distortion occurs according to the floor distance graph from the cliff sensor 118 which is periodically read, the user terminal 3 is alerted and the motor 38 is stopped at the current position and does not move any longer (S27).

Next, the controller 150 determines whether the output current value is periodically distorted from the motor current graph from the motor sensor 160 (S25).

In a normal floor condition as shown in FIG. 12A, a constant value may be maintained without severe variation in the value of the output current of the motor sensor 160 as the mop cloth 91, 92 rotates.

Meanwhile, when the mop cloth 91, 92 is not correctly attached as shown in FIG. 12B, as indicated by the dotted line, when the spin mop rotates, the current load periodically increases due to the overlap of the mop cloth 91, 92.

As described above, when a distortion, i.e. a periodic inflection point, occurs according to the output current graph from the motor sensor 160 which is periodically read, the user terminal 3 is alerted and the motor is stopped at the current position and does not move any longer (S27).

Next, the controller 150 determines whether the angle value is periodically distorted from the angle graph from the gyro sensor 112 (S26).

In the normal floor condition as shown in FIG. 13A, a constant magnitude is maintained with little variation in a relative angle from the starting angle during the forward movement operation in which the posture is controlled.

Meanwhile, when the mop cloth 91, 92 is not correctly attached as shown in FIG. 13B, when the spin mop moves forward while rotating, the disturbance, which is an angle change of the cleaner 100, is periodically generated, so that a large angle change and a small angle change to correct this occur continuously.

As described above, when a periodic angle change occurs according to the relative angle graph from the gyro sensor 112 that is periodically read, the user terminal 3 is alerted and the motor 38 is stopped at the current position so that there is no movement any more (S27).

The controller 150 receives a detection signal of each sensor received according to each cycle, and analyzes the detected signal to determine whether the mop cloth 91, 92 is correctly attached to the spin mop.

In the above, it is described that the determination of the detection signal of the sensor is in sequence, but the present disclosure is not limited thereto and may be determined simultaneously, and may be determined in a different order.

The robot system according to the present embodiment may have a configuration as shown in FIG. 1, and when the robot cleaner 100 performing the operation as shown in FIG. 9 exists in the robot system, in association with the server 2 and the user terminal 3, an alarm for incorrect attachment of the mop cloth 91, 92 may be provided to the user by using the detection signal of the plurality of sensor values Hereinafter, a control method in the robot system will be described with reference to FIG. 14.

Figure 14:
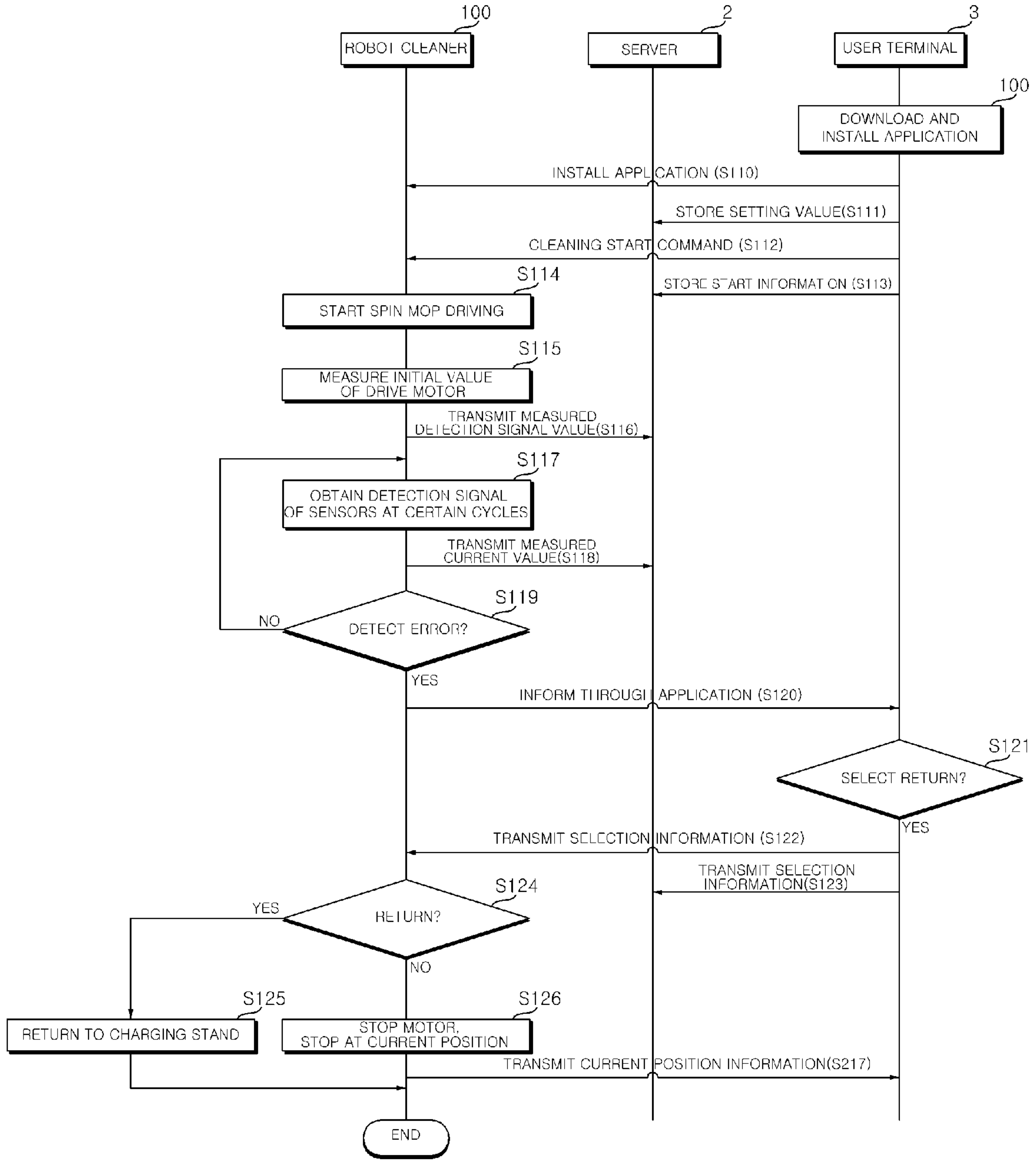
FIG. 14 is a flow chart illustrating an overall operation of a robot cleaner system of the present disclosure according to FIG. 1.

Referring to FIG. 14, in a robot system including the robot cleaner 100 according to an embodiment of the present disclosure, the robot cleaner 100, the server 2, and the user terminal 3 may perform wireless communication with each other and may perform control on the robot cleaner 100.

First, the server 2 of the robot system produces a user application capable of controlling the robot cleaner 100, and retains the application in a state where it can be distributed online.

The user terminal 3 downloads and installs the user application online (S100).

The user terminal 3 executes a user application, registers a member and registers the robot cleaner 100 owned by the user in a corresponding application, and interoperates the application with the robot cleaner 100.

Figure 15A:
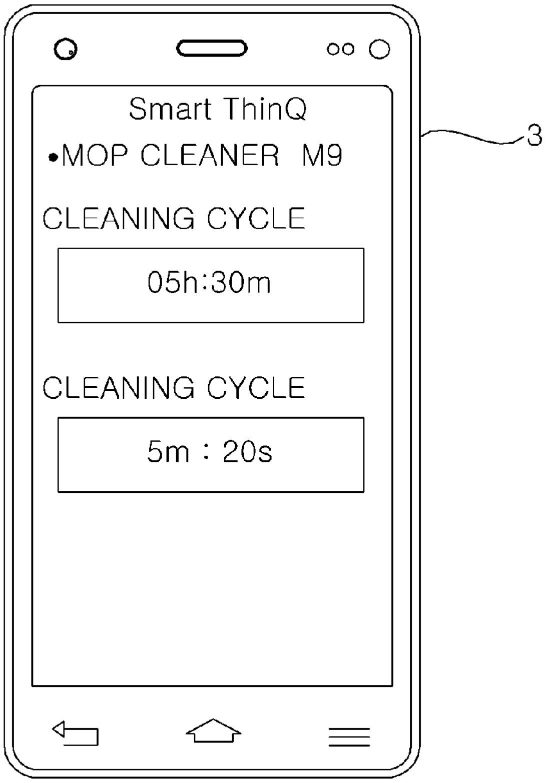
FIGS. 15A and 15B are state diagrams of a user terminal for explaining the flowchart of FIG. 14.

The user terminal 3 may set various functions with respect to a corresponding robot cleaner 100, specifically, as shown in FIG. 15A, set a cleaning cycle, and a sensor detection cycle setting for checking the incorrect attachment of the mop cloth 91, 92, and set a method of alarming the result of checking the incorrect attachment of the mop cloth 91, 92 according to such a cycle, and the like (S110).

A cycle for checking the incorrect attachment of the mop cloth 91, 92 is preferably 1 to 10 minutes, and more preferably, 1 to 6 minutes.

As alarm method, sound alarm and display alarm can be selected, and alarm cycle can be set.

In addition to displaying an alarm on an application of the user terminal 3 as an alarm method, a method of alerting the user by providing an alarm by the robot cleaner 100 itself may also be selected.

The user terminal 3 transmits the data to the server 2 through the application for such setting information, and stores the data in the server 2 (S111), and transmits data related to the cycle for checking the incorrect attachment of the mop cloth 91, 92 and alarm setting information through wireless communication.

Next, the robot cleaner 100 may receive a cleaning start command from the application of the user terminal 3 (S112). At this time, the start information from the application of the user terminal 3 can be transmitted to the server 2 and stored in the server 2 (S113).

The robot cleaner 100 controls the drive motor 38 and the pump 34 to start cleaning according to the received cleaning start command (S114).

In this case, the controller 150 of the robot cleaner 100 may set an initial value by reading an initial current value of the drive motor 38 for rotating the spin mop (S115).

The robot cleaner 100 may transmit information on the initial current value measured by the server 2 through the communication unit (S116), and the server 2 may store the information.

At this time, when it is necessary to read the initial values of the other sensors for checking the incorrect attachment of the mop cloth 91, 92, it is possible to receive an initial signal from each sensor in the initial operation.

The controller 150 transmits a control signal to the motor controller 160 to proceed with traveling and cleaning while rotating the spin mop. The spin mop also performs wet cleaning in a state of including a certain percentage of water content according to water spray from the nozzle due to driving of the pump 34.

In this case, the controller 150 may proceed with the cleaning intensity and the traveling by controlling the rotation direction and the rotation speed of the spin mop, and perform cleaning while traveling in a certain mode according to the cleaning zone.

The controller 150 controls to read a detection signal from the mop cloth sensor, the motor sensor, and the gyro sensor at certain cycles (S117). Each sensor may read the same signal value as in FIG. 9 and periodically transmit the same signal value to the controller 150.

The controller 150 receives the detection signal of each sensor received according to each cycle.

The robot cleaner 100 may transmit information on the current value of a corresponding period measured by the server 2 through the communication unit, and the server 2 may store the information (S118).

Next, the controller generates a graph from each detection signal, and determines whether there is a distortion in each graph (S119).

Specifically, the robot cleaner 100 generates a graph for a distance movement amount from the image sensor 116, a bottom distance from the cliff sensor 118, an output current from the motor sensor 160, and an angle value from the gyro sensor 112, and determines whether distortion has occurred in the graph.

The controller 150 determines whether there is a waveform distortion in the graph for each detection signal, and accordingly determines whether there is a incorrect attachment of the mop cloth 91, 92 (S119).

If any one of the plurality of detection signals is distorted, the controller 150 determines that the mop cloths 91, 92 is incorrectly attached, and accordingly, inform the user terminal 3 that the mop cloth 91, 92 of corresponding robot cleaner 100 is incorrectly attached through an application (S120).

Figure 15B:

As shown in FIG. 15B, the user terminal 3 may display an information window for the robot cleaner 100 in the corresponding application, and an alarm of incorrect attachment of the mop cloth 91, 92 may be displayed on the information window.

At this time, the alarm of incorrect attachment of the mop cloth 91, 92 may blink periodically to call user's attention.

The application of the user terminal 3 may induce a command for the next operation of corresponding robot cleaner 100 to a user together with the alarm of incorrect attachment of the mop cloth 91, 92.

For example, as shown in FIG. 15B, a selectable icon for various operations may be activated below or around the alarm of incorrect attachment of the mop cloth 91, 92.

Specifically, as the next operation, the returning to the charging stand or the stopping of cleaning may be iconized and activated.

The user terminal 3 may select one of the icons and transmit the selection information to the robot cleaner 100 (S122).

When the robot cleaner 100 analyzes the selection information and the returning is selected (S124), the operation of the pump of the robot cleaner 100 is stopped so that water spray from the nozzle is stopped, and the returning to the charging stand 200 proceeds in the state of a dry mop while maintaining the rotation of the spin mop (S125).

Meanwhile, when the cleaning stop icon of the user terminal 3 is selected, the robot cleaner 100 stops both the operation of the pump 34 and the operation of the drive motor 38 to stop the water spray of the robot cleaner 100 and the rotation of spin mop. The robot cleaner 100 stops at the current position in the state in which the operation is stopped (S126).

At this time, when the icon of the cleaning stop is selected according to the setting, information related to the current position is transmitted to the user terminal 3 to induce the user to reattach the mop cloth 91, 92 (S217).

As described above, information on the attachment of the mop cloth 91, 92 is periodically determined by the detection signal from various sensors, and cleaning is continued in the state in which the mop cloth 91, 92 is incorrectly attached, so that deviating from a progress path and proceeding of incomplete cleaning in one side can be prevented.

Meanwhile, the control method of the robot cleaner 100 according to another embodiment of the present disclosure can also determine the attachment of foreign matter to the mop cloth 91, 92 as well as the incorrect attachment of the mop cloth 91, 92 according to a plurality of sensors.

Hereinafter, a method of controlling a robot cleaner according to another embodiment of the present disclosure will be described with reference to FIGS. 16 to 18.

Figure 16:
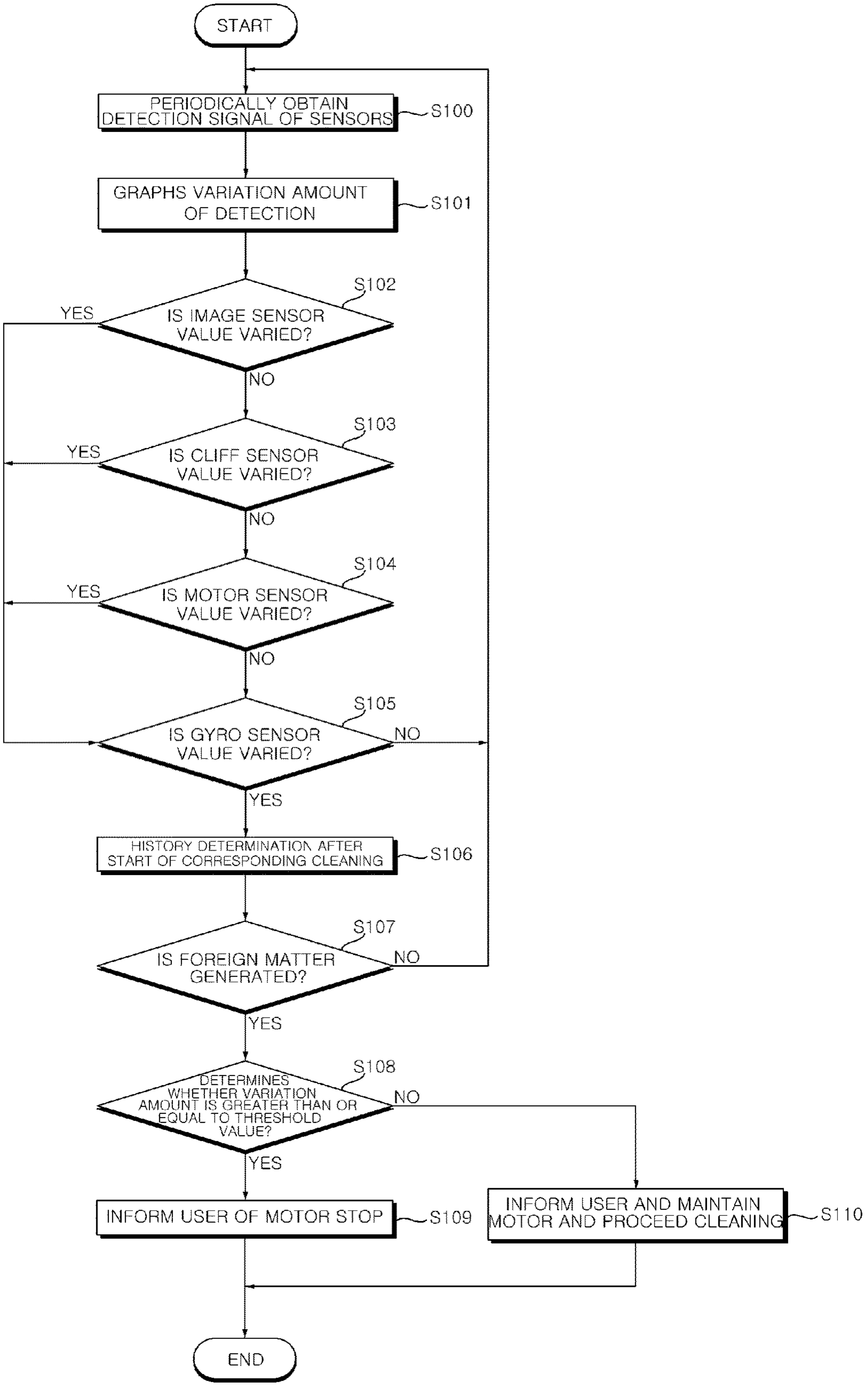
FIG. 16 is a flowchart illustrating a method of controlling a robot cleaner according to another embodiment of the present disclosure.
Figure 17A:
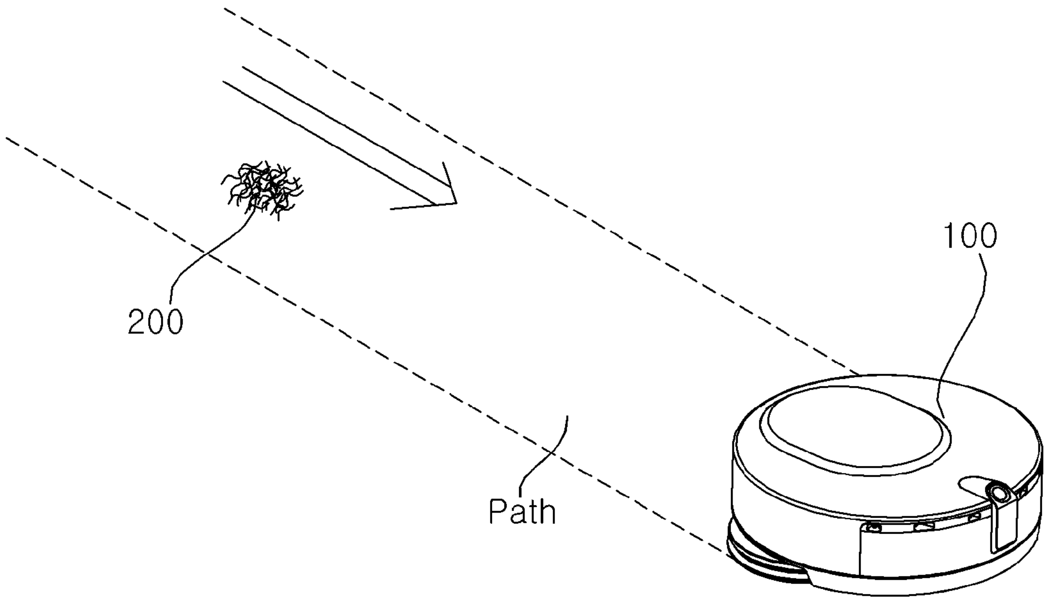
FIGS. 17A and 17B are state diagrams when foreign matter is attached to a robot cleaner.
Figure 17B:
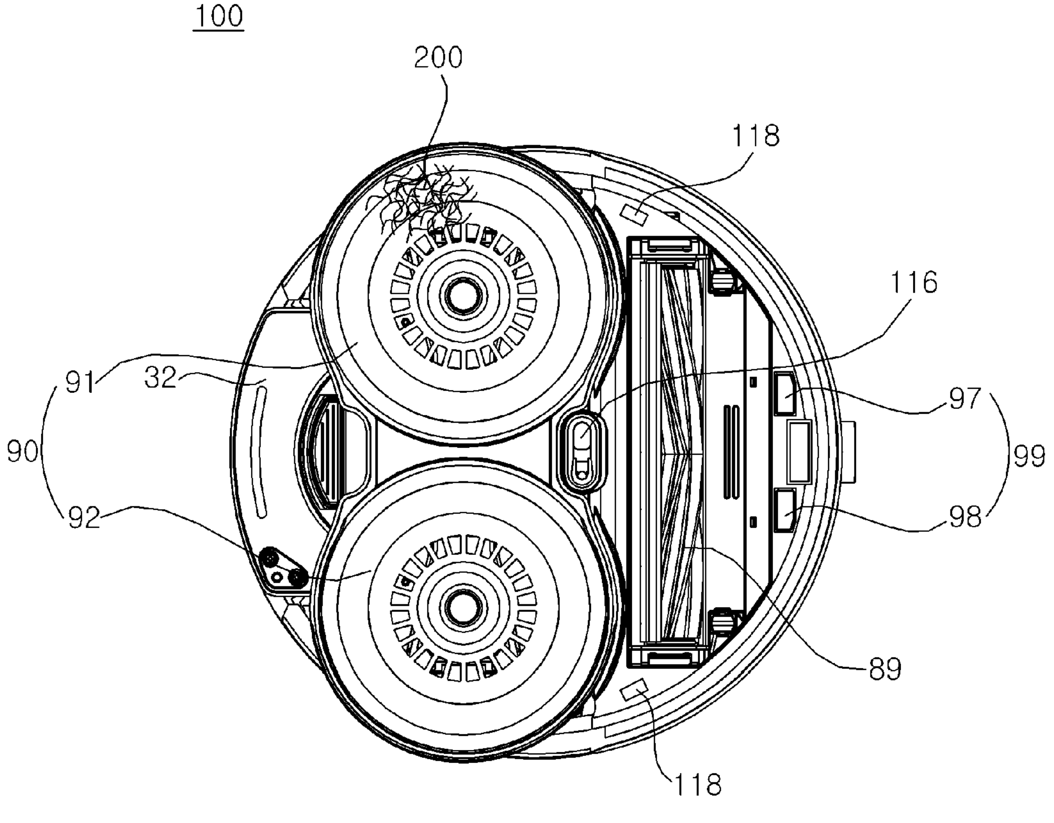
Figure 18:
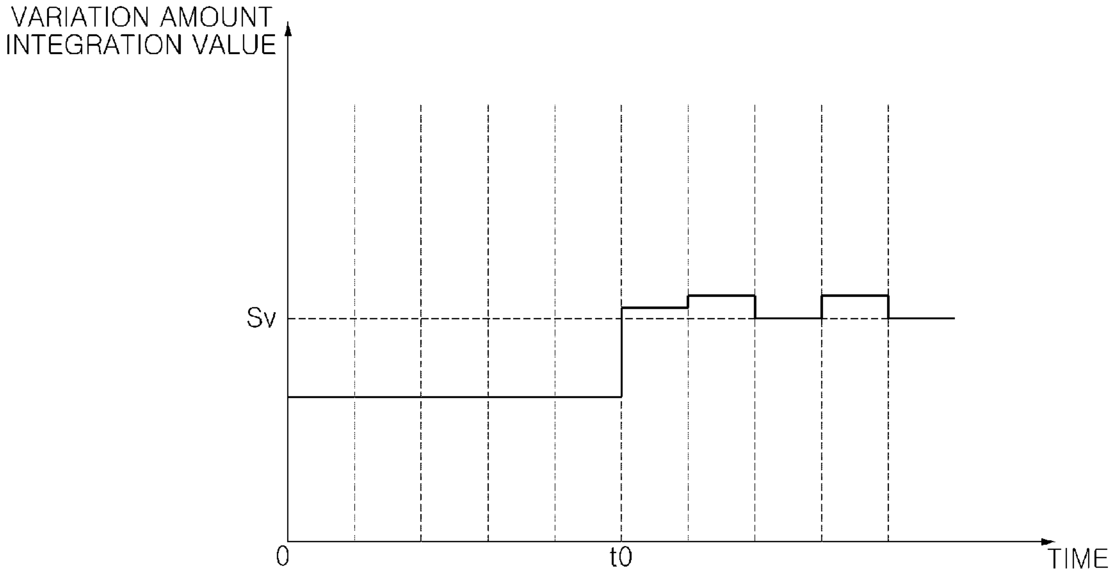
FIG. 18 is a waveform diagram illustrating a signal waveform of a detection signal integrated value of FIG. 16.

FIG. 16 is a flowchart illustrating a method of controlling a robot cleaner according to another embodiment of the present disclosure, FIGS. 17A and 17B are state diagrams when foreign matter is attached to a robot cleaner, and FIG. 18 is a waveform diagram illustrating a signal waveform of a detection signal integrated value of FIG. 16.

Specifically, when foreign matter is placed on a path while the robot cleaner 100 travels as shown in FIG. 17A, the case where foreign matter 200 is attached to the mop cloth 91, 92 by the moisture and pressure of the mop cloth 91, 92 occurs.

The foreign matter 200, such as hair or dust as shown in FIG. 17A, may be difficult to remove by itself unless the user removes it.

When the foreign matter 200 is attached as described above, a fail occurs when the spin mop is rotated depending on the volume and thickness of the foreign matter 200.

The traveling fail due to the attachment of the foreign matter 200 of the robot cleaner 100 can be detected through a plurality of sensors.

Referring to FIG. 16, the robot cleaner 100 according to another embodiment of the present disclosure may receive a cleaning start command from an application of the server 2 or the user terminal 3. In addition, the robot cleaner 100 may receive a cleaning start command through the input unit 140 directly from the user.

The controller 150 proceeds with traveling and cleaning while rotating the spin mop. The spin mop also performs wet cleaning in a state of including a certain percentage of water content according to water spray from a nozzle due to driving of the pump 34.

In this case, the controller 150 may proceed with the cleaning intensity and the traveling by controlling the rotation direction and the rotation speed of the spin mop, and perform cleaning while traveling in a certain mode according to the cleaning zone.

In this case, the controller 150 may periodically obtain a detection signal from a plurality of sensors, specifically, a mop cloth sensor, a spin mop motor sensor 160, a gyro sensor 112, and the like (S100).

The controller 150 may obtain a detection signal from the image sensor 116 and the cliff sensor 118 which are the mop cloth sensor at certain cycles, and obtain the detection signal from the motor sensor 160 and the gyro sensor 112, thereby determining whether foreign matter 200 is attached to the mop cloth 91 and 92 through the obtained detection signal.

That is, the controller 150 reads and graphs each variation amount in order to indicate a signal waveform from the detection signal from each sensor (S101).

As described above, the graph of the detection signal of each sensor may be as shown in FIGS. 10A to 13D.

In FIG. 10A to FIG. 13D, a graph A indicates a detection signal in a normal traveling state by each sensor, the image sensor 116, the cliff sensor 118, the motor sensor, and the tilt sensor, and a graph B indicates a detection signal in the foreign matter 200 attachment state by each sensor.

The controller 150 determines whether there is an abnormality, that is, a distortion of the detection signal, while reading each graph.

First, the controller 150 determines whether the distance value is periodically distorted from the movement amount graph from the image sensor 116 (S102).

That is, when the foreign matter 200 is attached to the bottom surface of the mop cloth 91, 92 while traveling as shown in FIG. 17B, there occurs a distortion section in which the movement amount periodically slows down, stops, and retracts in a constant speed forward movement due to the volume and thickness of the foreign matter 200.

In this distortion phenomenon, the distortion of the movement amount may be periodically detected in comparison with the expected converted position during the intended motion operation such as the rotation in place instead of the forward movement.

Meanwhile, the controller 150 may show a graph of distance variation from the floor from the detection signal from the cliff sensor 118 as shown in FIGS. 11A and 11B.

If no variation is found from the image sensor 116, the controller 150 determines whether the floor distance value is periodically distorted based on the variation amount from the cliff sensor 118 (S103).

In a normal floor condition as shown in FIG. 11A, it is possible to maintain a constant value without significant variations in the floor distance according to the rotation traveling of the spin mop.

Meanwhile, when the foreign matter 200 is attached to the mop cloth 91, 92 as shown in FIG. 11B, as indicated by the dotted line, the mop cloth 91, 92 periodically interferes with the cliff sensor 118 during the constant speed rotation, so that it is shown that the floor distance value is periodically reduced.

In this distortion phenomenon, the distortion of the floor distance may be periodically detected in comparison with the expected converted position during the intended motion operation such as the rotation in place instead of the forward movement.

Next, the controller 150 determines whether the output current value is periodically distorted from the motor current graph from the motor sensor 160 (S104).

In a normal floor condition as shown in FIG. 12A, it is possible to maintain a constant value without significant variations in the output current value of the motor sensor 160 according to the rotational traveling of the spin mop 91, 92.

Meanwhile, when foreign matter 200 is attached to the mop cloth 91, 92 as shown in FIG. 12B, as indicated by the dotted line, when the spin mop rotates, the current load is periodically increased by the attachment of the foreign matter 200.

Next, the controller 150 determines whether the angle value is periodically distorted from the angle graph from the gyro sensor 112 (S105).

In the normal floor condition as shown in FIG. 13A, a constant magnitude is maintained with little variation in a relative angle from the starting angle during the forward movement operation in which the posture is controlled.

Meanwhile, when there is foreign matter in the mop cloth 91, 92, as shown in FIG. 13B, when the spin mop rotates to move forward, a disturbance that is an angle change of the cleaner 100 periodically occurs, so that a large angle change and a small angle change for correcting this occur continuously.

When variation amount occurs in any one or more of the detection signals of the sensors, the controller 150 determines that the mop cloth 91, 92 is incorrectly attached or the foreign matter 200 is attached to the mop cloth 91, 92. Then, history determination is performed to determine whether the foreign matter 200 is attached (S106).

That is, as shown in FIG. 18, the variation amount of the detection signal in each period is integrated, and the variation amount level accumulated in each period is graphed.

Next, the controller 150 reads the graph of the variation amount integration value and determines whether corresponding variation amount is caused by the incorrect attachment of the mop cloth 91, 92 or by the foreign matter 200 (S107).

That is, if the variation amount integration value is constant for each cycle, it is considered it has a uniform variation amount from the starting point of traveling, so that it is determined that the mop cloth 91, 92 is incorrectly attached, thereby proceeding an alarm according to the scenario of the incorrect attachment of the mop cloth 91, 92 mentioned above.

Meanwhile, when the variation amount integration value is maintained uniformly for a certain period and then the variation amount integration value increases from a certain point of time, it is determined that the foreign matter 200 is attached at a corresponding point of time.

It is possible to determine the point of time of a pulse which is generated when the accumulated value is also maintained at a level similar to 0 as there is no variation amount, as the point of time of attachment of the foreign matter 200, and it is not necessary that the variation amount integration value before the point of time of pulse maintains a certain level.

When the variation amount integration value does not exists and then suddenly occurs, the controller 150 determines whether an amplification amount of the variation amount integration value is greater than or equal to a threshold value (S108).

If the variation amount integration value greater than or equal to a certain level, that is, a threshold value or more, it may be determined that the foreign matter 200 interferes with traveling. If it is greater than or equal to the threshold value, the robot cleaner 100 stops traveling by stopping the motor, and the user terminal 3 may be alerted to induce foreign matter removal by the user (S109).

Meanwhile, if the variation amount integration value is smaller than the threshold value, it can be determined that a very small amount of foreign matter 200 is attached to such an extent that it does not interfere with traveling and cleaning, thereby proceeding with cleaning and traveling while maintaining the motor and water spray (S110).

However, even when the cleaning is performed like this, the user terminal 3 may be provided with information on a state in which the foreign matter 200 is attached, so that the user may remove the foreign matter 200 if the user desires to remove the foreign matter.

In the above, it is described that the determination of the detection signal of the sensor is in sequence, but the present disclosure is not limited thereto and may be determined simultaneously, and may be determined in a different order.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

[EXPLANATION OF REFERENCE NUMERAL]

| | |
|---|---|
| 100: ROBOT CLEANER | 2: SERVER |
| 3: USER TERMINAL | 10: MAIN BODY |
| 32: WATER TANK | 34: PUMP |
| 38: DRIVE MOTOR | 80: ROTATION MOP |
| 90: MOP CLOTH | 112: GYRO SENSOR |
| 118: CLIFF SENSOR | 116: IMAGE SENSOR |
| 150: CONTROLLER | 160: MOTOR SENSOR |
| 130: STORAGE UNIT | 140: INPUT UNIT |

The invention claimed is:

1. A robot cleaner comprising:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit, and control driving of the rotary mop module, wherein the rotating plate comprises a first rotating plate and a second rotating plate and wherein the mop detecting unit comprises a distance sensor disposed in a surplus space below the main body and between the first and second rotating plates.

2. The robot cleaner of claim 1, wherein the controller determines an incorrect attachment of the mop cloth or a foreign matter attachment of the mop cloth among the error state of the mop cloth.

3. The robot cleaner of claim 2, wherein the mop detecting unit is disposed in the surplus space below the main body exposed around the rotating plate to detect the error state of the mop cloth, when the rotary mop module is disposed in the lower portion of the main body.

4. The robot cleaner of claim 3, wherein the distance sensor comprises an image sensor.

5. The robot cleaner of claim 4, wherein the controller detects a movement amount from the image sensor, and determines that the mop cloth is incorrectly attached when there is an area where the movement amount is periodically distorted.

6. The robot cleaner of claim 1, wherein the controller periodically obtains an output current of the motor, and determines that an error state of the mop cloth occurs when the output current is periodically increased.

7. The robot cleaner of claim 1, wherein the controller periodically obtains tilt angle information of the robot cleaner from a gyro sensor, and determines that an error state of the mop cloth occurs when there is disturbance in the angle.

8. A robot cleaner comprising:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit, and control driving of the rotary mop module, wherein the rotating plate comprises a first rotating plate and a second rotating plate, and wherein the mop detecting unit comprises two cliff sensors disposed in a surplus space between the rotating plates and a boundary surface below the main body, in the outside of the first and second rotating plates.

9. The robot cleaner of claim 8, wherein the controller detects a floor distance from the cliff sensor, and determines that the mop cloth is incorrectly attached when the floor distance is distorted.

10. A robot cleaner comprising:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit, and control driving of the rotary mop module wherein the controller determines an incorrect attachment of the mop cloth or a foreign matter attachment of the mop cloth among the error state of the mop cloth, and wherein, when there is a variation in detection information of the mop detecting unit, the controller determines that the foreign matter is attached, when the variation occurs after a certain time is elapsed after the cleaning is started.

11. The robot cleaner of claim 10, wherein, when a variation amount in the detection information is greater than or equal to a threshold value, the controller stops movement at a current position, and induces removal of the foreign matter by alarming a user terminal.

12. A robot system comprising:

a robot cleaner configured to perform wet cleaning in a cleaning zone;

a server configured to communicate with the robot cleaner and perform control of the robot cleaner; and a user terminal configured to be in association with the robot cleaner, and control the robot cleaner as an application for the control of the robot cleaner is activated, wherein the robot cleaner comprises:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit, and control driving of the rotary mop module, wherein the rotating plate comprises a first rotating plate and a second rotating plate, and wherein the mop detecting unit comprises a distance sensor disposed in a surplus space below the main body and between the first and second rotating plates.

13. The robot system of claim 12, wherein the controller determines an incorrect attachment of the mop cloth or a foreign matter attachment of the mop cloth among the error state of the mop cloth.

14. The robot system of claim 13, wherein the controller periodically obtains an output current of the motor, and determines that an error state of the mop cloth occurs when the output current is periodically increased.

15. The robot system of claim 13, wherein the controller periodically obtains tilt angle information of the robot cleaner from a gyro sensor, and determines that an error state of the mop cloth occurs when there is disturbance in the angle.

16. The robot system of claim 12, wherein the mop detecting unit is disposed in the surplus space below the main body exposed around the rotating plate to detect the error state of the mop cloth, when the rotary mop module is disposed in the lower portion of the main body.

17. The robot system of claim 12, wherein the distance sensor comprises an image sensor.

18. The robot system of claim 17, wherein the controller detects a movement amount from the image sensor, and determines that the mop cloth is incorrectly attached when there is an area where the movement amount is periodically distorted.

19. The robot system of claim 12, wherein the robot cleaner performs a wet cleaning while performing a pattern traveling due to a rotation of the rotary mop module.

20. A robot system comprising:

a robot cleaner configured to perform wet cleaning in a cleaning zone;

a server configured to communicate with the robot cleaner and perform control of the robot cleaner; and a user terminal configured to be in association with the robot cleaner, and control the robot cleaner as an application for the control of the robot cleaner is activated, wherein the robot cleaner comprises:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit and control driving of the rotary mop module, wherein the rotating plate comprises a first rotating plate and a second rotating plate, and wherein the mop detecting unit comprises two cliff sensors disposed in a surplus space between the rotating plates and a boundary surface below the main body, in the outside of the first and second rotating plates.

21. The robot system of claim 20, wherein the controller detects a floor distance from the cliff sensor, and determines that the mop cloth is incorrectly attached when the floor distance is distorted.

22. A robot system comprising:

a robot cleaner configured to perform wet cleaning in a cleaning zone;

a server configured to communicate with the robot cleaner and perform control of the robot cleaner; and a user terminal configured to be in association with the robot cleaner, and control the robot cleaner as an application for the control of the robot cleaner is activated, wherein the robot cleaner comprises:

a main body configured to form an outer shape;

a pair of rotary mop modules configured to be rotatably installed in the main body, move the main body while rotating, and have a mop cloth attached to a rotating plate of a lower portion;

a drive motor configured to rotate the pair of rotary mop modules;

a mop detecting unit configured to detect an error state of the mop cloth attached to the rotating plate and output a detection signal; and a controller configured to determine the error state of the mop cloth according to the detection signal from the mop detecting unit and control driving of the rotary mop module, wherein the controller determines an incorrect attachment of the mop cloth or a foreign matter attachment of the mop cloth among the error state of the mop cloth, wherein, when there is a variation in detection information of the mop detecting unit, the controller determines that the foreign matter is attached, when the variation occurs after a certain time is elapsed after the cleaning is started.

23. The robot system of claim 22, wherein, when a variation amount in the detection information is greater than or equal to a threshold value, the controller stops traveling at a current position, and induces removal of the foreign matter by alarming a user terminal.

* * * * *